US012698957B2

(12) United States Patent
Equis et al.

(10) Patent No.: US 12,698,957 B2
(45) Date of Patent: Aug. 4, 2026

(54) OPTICAL DIFFRACTION TOMOGRAPHY MICROSCOPE

(71) Applicant: NANOLIVE SA, Tolochenaz (CH)

(72) Inventors: Sebastien Equis, Penthalaz (CH); Yann Cotte, Saint Saphorin sur Morges (CH); Pierre-Alain Cotte, Amberg (DE)

(73) Assignee: NANOLIVE SA, Tolochenaz (CH)

( * ) Notice: Subject to any disclaimer, the term of this patent is extended or adjusted under 35 U.S.C. 154(b) by 356 days.

(21) Appl. No.: 18/257,032

(22) PCT Filed: Dec. 13, 2021

(86) PCT No.: PCT/EP2021/085563
§ 371 (c)(1),
(2) Date: Jun. 12, 2023

(87) PCT Pub. No.: WO2022/128964
PCT Pub. Date: Jun. 23, 2022

(65) Prior Publication Data
US 2024/0053135 A1      Feb. 15, 2024

(30) Foreign Application Priority Data
Dec. 14, 2020      (EP) ..................................... 20213959

(51) Int. Cl.
G01B 9/02            (2022.01)
G01B 9/02091      (2022.01)

(52) U.S. Cl.
CPC ..... G01B 9/02047 (2013.01); G01B 9/02091 (2013.01)

(58) Field of Classification Search
CPC ............ G01B 9/02047; G01B 9/02091; G01B 9/02022; G01B 9/02057
See application file for complete search history.

(56) References Cited

U.S. PATENT DOCUMENTS

| | | | |
|---|---|---|---|
| 10,520,295 B2 * | 12/2019 | Cotte ................. | G01B 9/02047 |
| 10,890,745 B2 * | 1/2021 | Heuck ................... | G02B 21/02 |
| 2007/0216906 A1 * | 9/2007 | Javidi .................. | G06V 20/695 |
| | | | 356/457 |
| 2009/0185195 A1 * | 7/2009 | Liesener ............ | G01B 9/02027 |
| | | | 356/521 |

(Continued)

FOREIGN PATENT DOCUMENTS

| | | | | |
|---|---|---|---|---|
| GB | 680221 A | * | 10/1952 | ......... G02B 17/0808 |
| WO | 2016046714 A2 | | 3/2016 | |

OTHER PUBLICATIONS

Li et al "High-speed in vitro intensity diffraction tomography", arxiv.org, Apr. 12, 2019, 20 pages (Year: 2019).*

(Continued)

*Primary Examiner* — Kara E. Geisel
*Assistant Examiner* — Jonathon Cook
(74) *Attorney, Agent, or Firm* — Nixon & Vanderhye PC

(57) ABSTRACT

34 P2418PC00 Abstract Optical diffraction tomography microscope (2) comprising an illumination system (4) configured for transmitting a sample beam through a sample observation zone, a detection 5 system (8) comprising at least one image sensor (54), and a wave collection system (6) comprising a lens (16) downstream of the sample observation zone configured for directing the sample beam towards the at least one image sensor.

21 Claims, 15 Drawing Sheets

(56) References Cited

U.S. PATENT DOCUMENTS

2019/0163132 A1* 5/2019 Sung ................... G03H 1/0443
2022/0404769 A1* 12/2022 Ideguchi ................. G01J 9/00

OTHER PUBLICATIONS

Juan M. Soto, José A. Rodrigo, and Tatiana Alieva, "Optical diffraction tomography with fully and partially coherent illumination in high numerical aperture label-free microscopy [Invited]," Appl. Opt. 57, A205-A214 (2018) (Year: 2018).*
Muller et al, The Theory of Diffraction Tomography, arXiv:1507. 00466 [q-bio.QM], (or arXiv: 1507.00466v3 [q-bio.QM] for this version) https://doi.org/10.48550/arXiv.1507.00466 (Year: 2016).*
Godavarthi, Charankumar. Optical Diffraction Tomography Microscopy: Towards 3D Isotropic Super-resolution. Diss. Institut Fresnel, 2016. (Year: 2016).*
Li et al., "High-speed in vitro intensity diffraction tomography", arxiv.org, Apr. 12, 2019, 20 pages.
Youngchan Kim et al., Common-path diffraction optical tomography for investigation of three-dimensional structures and dynamics of biological cells, Retrieved from the internet: URL:https://www. osapublishing.org/OE/fulltext.cfm?uri=oe-22-9-10398&id= 284120, May 5, 2014, Optics Express, 16 Pages.
International Search Report for PCT/EP2021/085563, mailed Apr. 4, 2022, 4 pages.
Written Opinion of the ISA for PCT/EP2021/085563, mailed Apr. 4, 2022, 5 pages.

* cited by examiner

FIG 1a
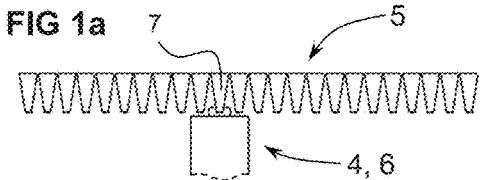
FIG 1b
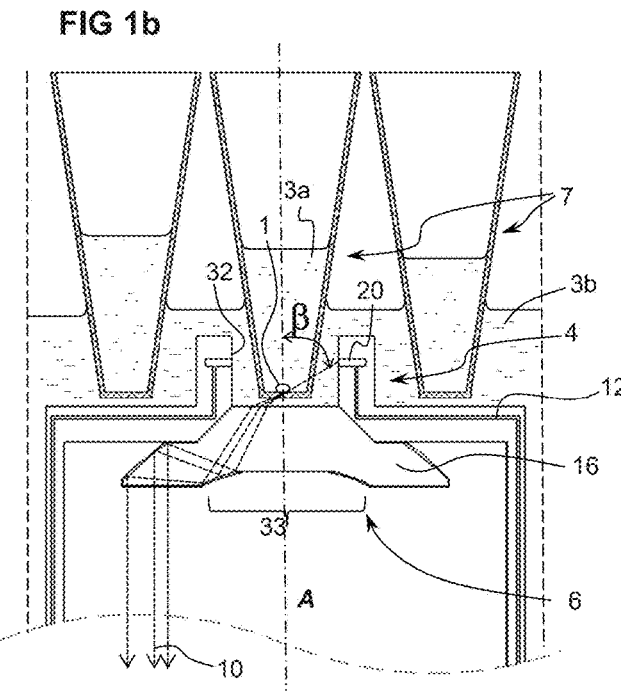
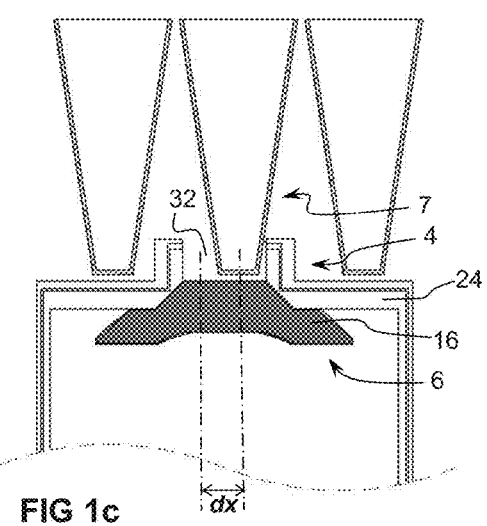
FIG 1c

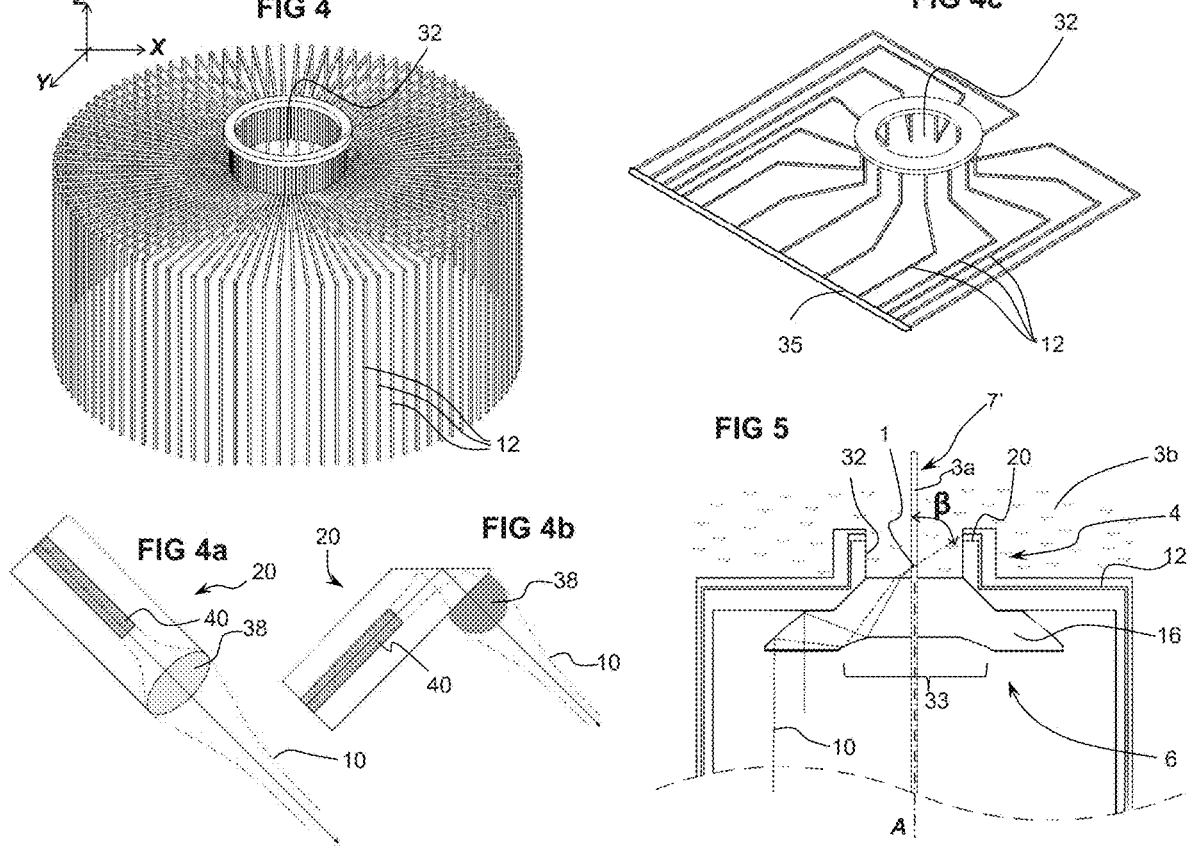

$$R = \frac{n}{\lambda}$$

$$\Delta v_\alpha = R(1 - \sqrt{1 - \sin^2 \alpha})$$

$$\Delta v_o = R(1 - \sqrt{1 - \sin^2 o})$$

$$\Delta v_e = \Delta v_\alpha - \Delta v_o = R(\sqrt{1 - \sin^2 o} - \sqrt{1 - \sin^2 \alpha})$$

FIG 9a
FIG 9b
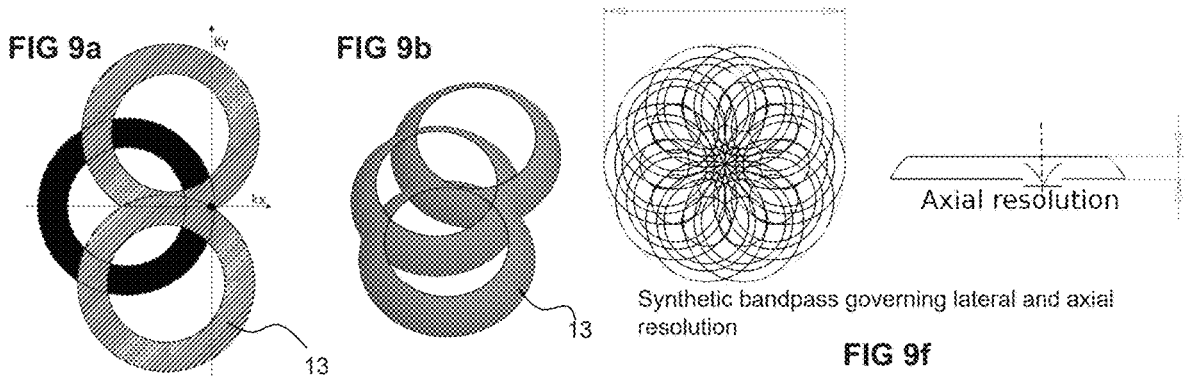
Lateral resolution
Axial resolution
Synthetic bandpass governing lateral and axial resolution
13
13
FIG 9f
11
FIG 9c
FIG 9d
FIG 9e
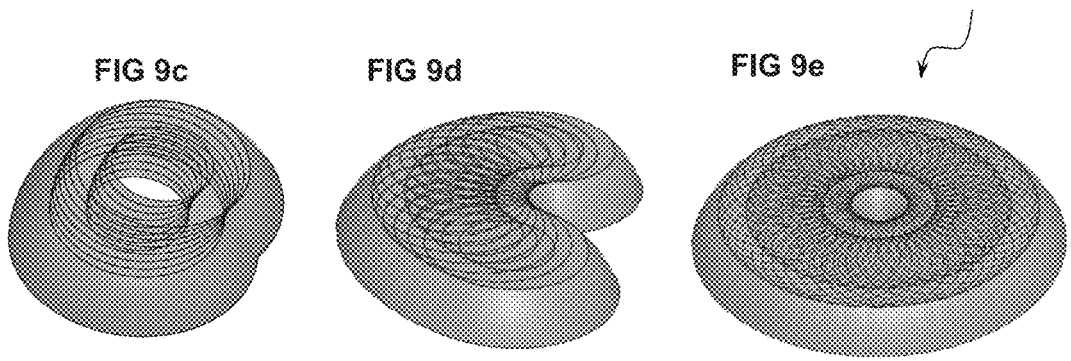

Problem
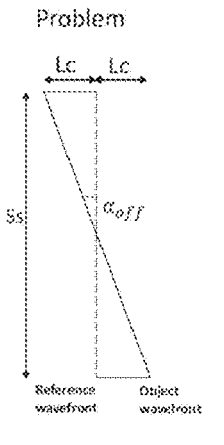
Solution 1
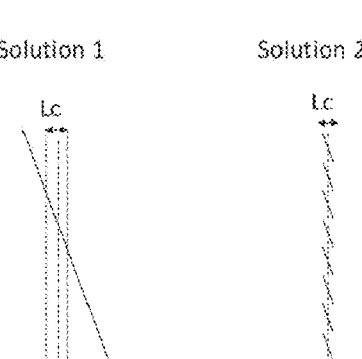
Solution 2
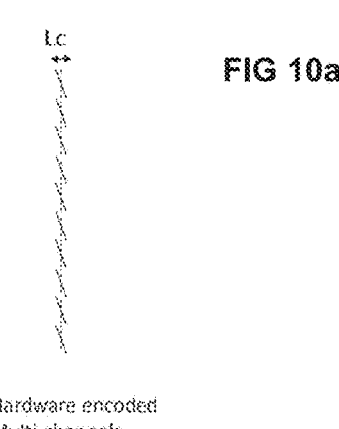
FIG 10a
Multi-channel
OPD Fast Scanning
Hardware encoded
Multi-channels
FIG 10b
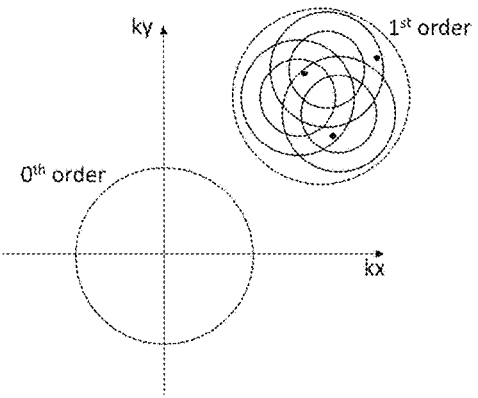

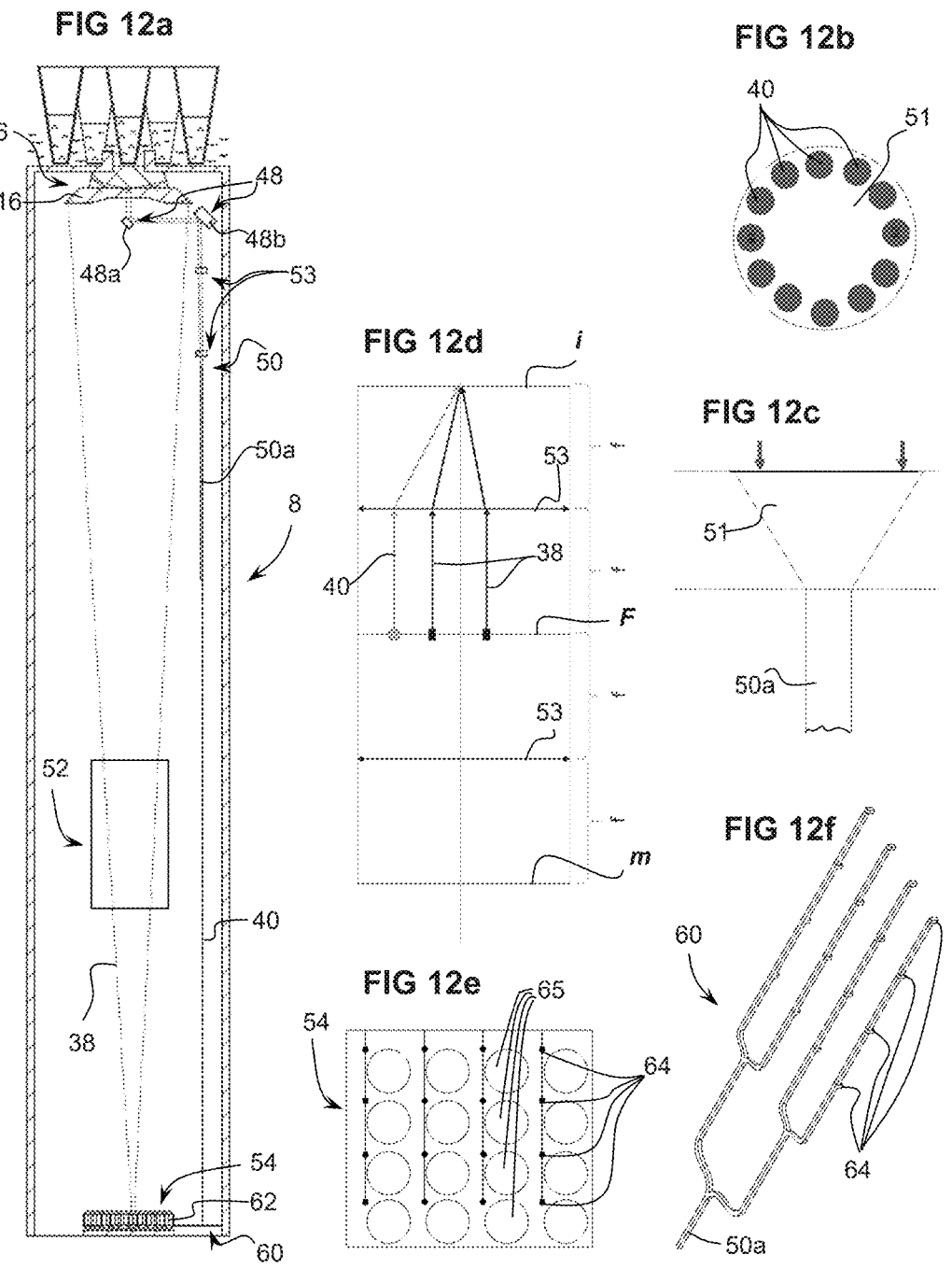

FIG 12h                                          FIG 12g
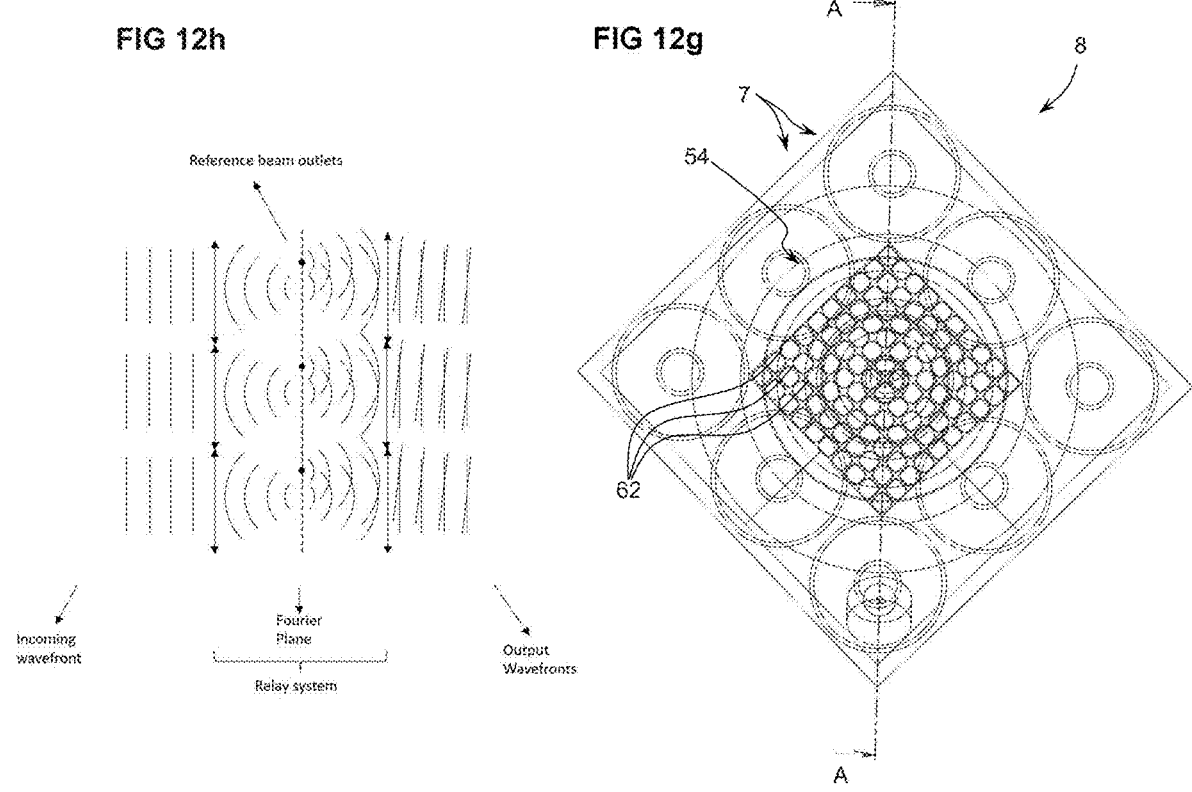

Figures 12I, 13:
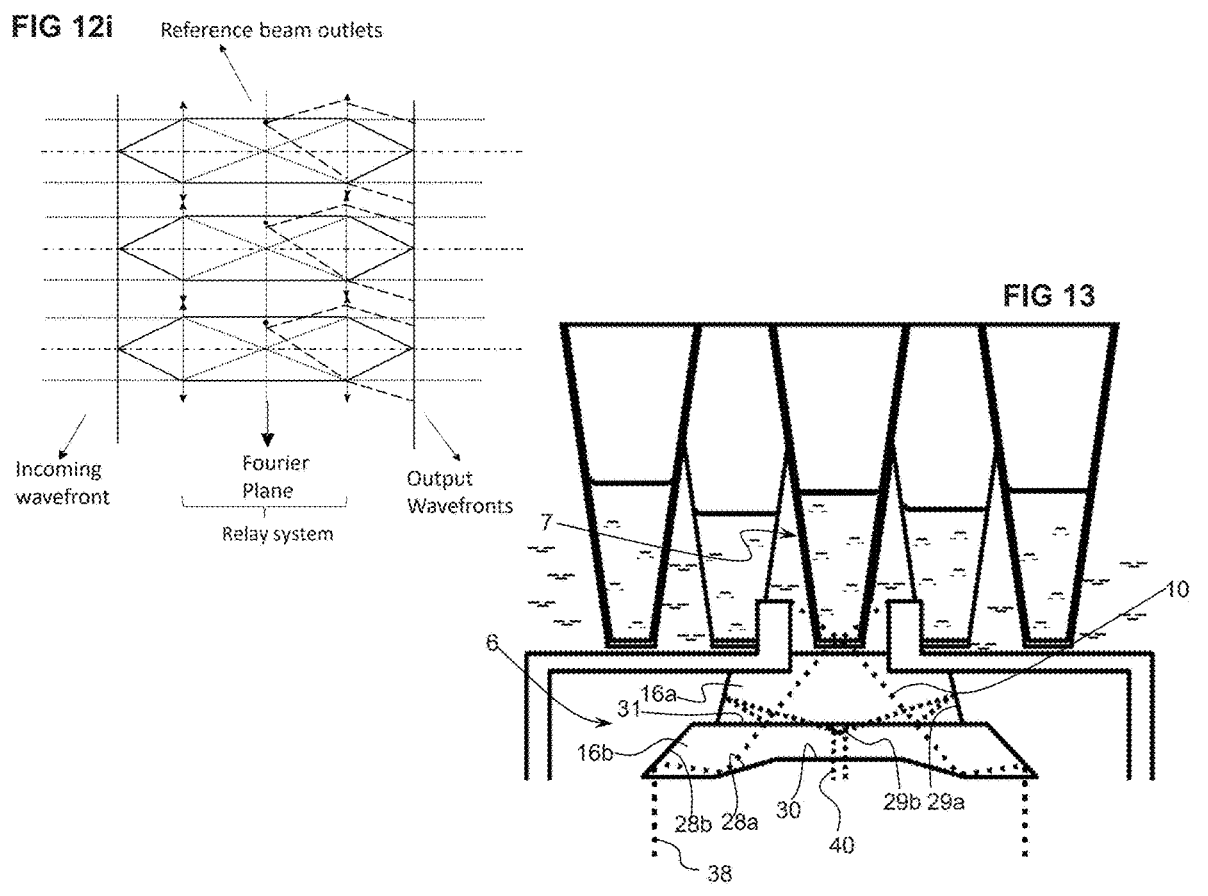

FIG 12i    Reference beam outlets

Incoming
wavefront

Fourier
Plane

Output
Wavefronts

Relay system

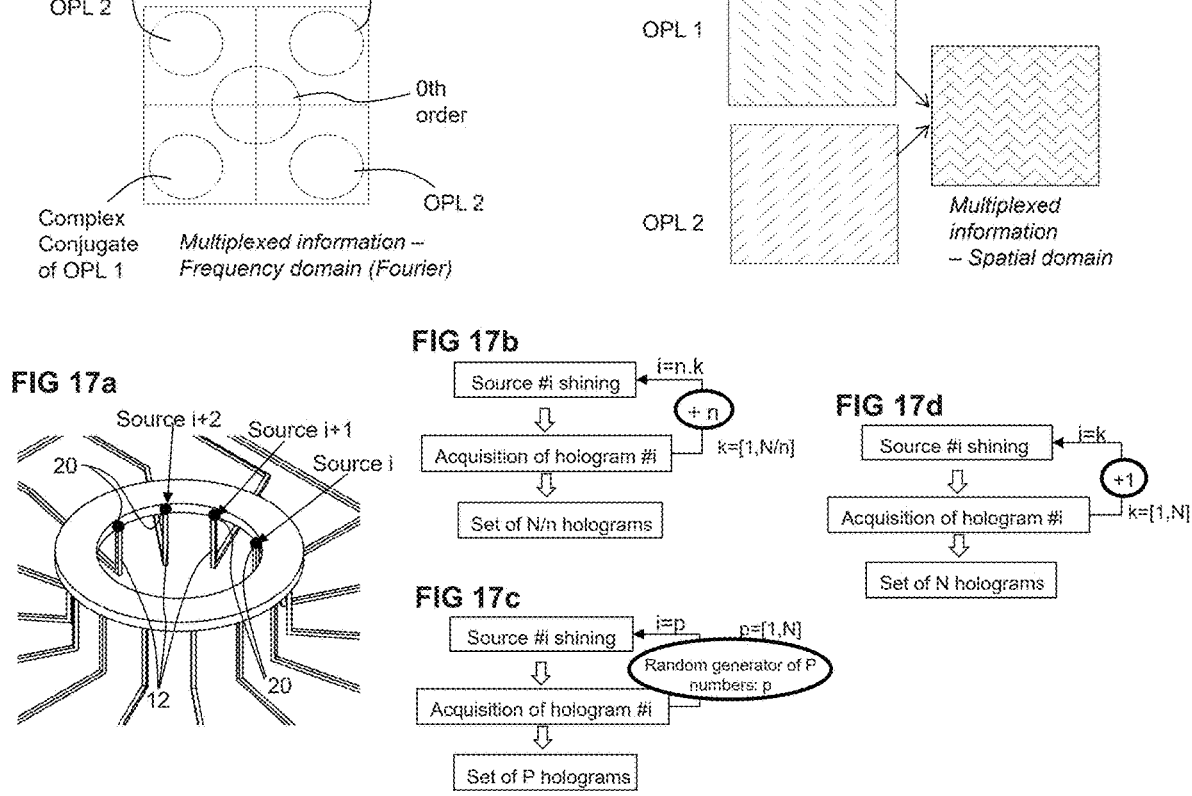

FIG 16f

Complex Conjugate of OPL 2

OPL 1

0th order

OPL 2

Complex Conjugate of OPL 1

*Multiplexed information – Frequency domain (Fourier)*

FIG 16e

OPL 1

OPL 2

*Multiplexed information – Spatial domain*

FIG 17a

Source i+2   Source i+1

Source i

Source #i shining   i=n.k

+n

Acquisition of hologram #i   k=[1,N/n]

Set of N/n holograms

FIG 17c

Source #i shining   i=p    p=[1,N]

Random generator of P numbers: p

Acquisition of hologram #i

Set of P holograms

FIG 17d

Source #i shining   i=k

+1

Acquisition of hologram #i   k=[1,N]

Set of N holograms

OPTICAL DIFFRACTION TOMOGRAPHY MICROSCOPE

This application is the U.S. national phase of International Application No. PCT/EP2021/085563 filed Dec. 13, 2021, which designated the U.S. and claims priority to EP Patent Application No. 20213959.8 filed Dec. 14, 2020, the entire contents of each of which are hereby incorporated by reference.

The present invention relates to optical diffraction tomography imaging devices and to an optical diffraction tomography microscope incorporating the devices. One of the specific applications relates to the holotomographic imaging of microscopic biological matter such as cells, parts of cells, and bacteria.

An optical diffraction tomography microscope with a rotating beam is disclosed in WO 2016046714. The rotating beam allows to obtain a large numerical aperture for tomographic reconstruction of a hologram of a sample, in particular a biological sample such as a cell, positioned in a sample zone through which a coherent illumination beam passes. The rotating beam mechanism is however somewhat complex and costly. Moreover, the observation of a plurality of biological samples is time consuming.

There is moreover a continuous desire to improve the resolution and image quality of the observed sample. In this regard, there is an advantage in having a numerical aperture that is as large as possible.

Biological samples are commonly contained in multi well plates with shapes and dimension that correspond to widely used standards. There would be an advantage in providing a microscope that is well-adapted for use with such multi well plates.

There would also be an advantage in providing a microscope that is well-adapted for use with other container systems.

In view of the foregoing, it is an object of this invention to provide an optical diffraction tomography microscope that is economical to use and that is capable of providing high quality reconstructed images of a sample to be observed.

It is advantageous to provide components for an optical diffraction tomography microscope that are economical to manufacture.

It is advantageous to provide components for an optical diffraction tomography microscope that are easy to use, install and maintain.

It is advantageous to provide an optical diffraction tomography microscope and components thereof that may be implemented with multi well plates.

It is advantageous to provide an optical diffraction tomography microscope and components thereof that is versatile and may be implemented with container systems of various configurations.

It is advantageous to provide an optical diffraction tomography microscope and components thereof that allow rapid observation of a plurality of samples to be observed, in particular biological samples such as cells and bacteria.

It is advantageous to provide an optical diffraction tomography microscope and components thereof that allow the observation of biological samples without markers, capable of generating high resolution images, including over an extended period of time for the observation of living processes.

Objects of the invention have been achieved by providing an optical diffraction tomography microscope according to claim 1.

Dependent claims describe various advantageous embodiments of the invention.

Disclosed herein is an optical diffraction tomography microscope comprising an illumination system configured for transmitting a sample beam through a sample observation zone, a wave collection system, and a detection system.

The detection system comprises at least one image sensor and the wave collection system comprises a lens downstream of the sample observation zone configured for directing the sample beam towards the at least one image sensor.

According to a first aspect of the invention, the wave collection system comprises a lens with an annular aperture, the wave collection system configured to collect sample illumination beams emitted by the sample illumination beam sources at a beam inclination angle with respect to a center axis extending through the sample observation zone, of between 10° and 85°, preferably between 40° and 75°.

According to a second aspect of the invention the optical diffraction tomography microscope further comprises a reference beam generation system and the detection system comprises a common-path configuration, said reference beam generation system configured to generate a reference beam from the sample beam.

According to a third aspect of the invention, the illumination system comprises a plurality of static sample illumination beam sources arranged around a sample observation zone of the illumination system within which a sample container is positionable, the static sample illumination beam sources configured to emit sample illumination beams at a beam inclination angle with respect to a center axis extending through the sample observation zone, the static sample illumination beam sources connected to a light generator configured to switch from one beam source to the next to generate a moving sample illumination beam around the sample observation zone.

In an advantageous embodiment the sample illumination beam sources are at a beam inclination angle with respect to a center axis extending through the sample observation zone, in a range between 50° and 70°.

In an embodiment, a ratio d1/d2 of a diameter d1 of the central obscuration relative to a diameter of an aperture d2 of the lens is in a range of 5% to 95%, preferably in a range of 30% to 90%.

In an advantageous embodiment the ratio d1/d2 of the diameter d1 of the central obscuration relative to the diameter of an aperture d2 of the lens is in a range of 50% to 80%.

In an embodiment, the lens comprises internal reflective surfaces including a first reflector and a second reflector.

In an embodiment, the lens comprises at least one centre internal inactive surface forming said central obscuration.

In an embodiment, the centre internal inactive surface comprises a light absorbing layer.

In an embodiment, the lens comprises a central inlet surface and internal reflective surfaces comprising a first reflector and a second reflector, the first reflector receiving the sample illumination beam incident from the inlet surface of the passage through the sample observation zone, and the second reflector receiving the sample illumination beam from the first reflector and further directing the sample illumination beam through an outlet surface of the lens body towards the detection system.

In an embodiment, the lens is fixedly mounted to the illumination system and an inlet surface of the lens forms a bottom surface of the sample observation zone.

In an embodiment, the lens is fixedly mounted to the wave guide support of the illumination system.

In an embodiment, the wave collection system is sealingly coupled to the illumination system such that a liquid medium may be filled within the sample observation zone over the lens inlet surface.

In an embodiment, a diameter of the sample observation zone bounded by the illumination system is in a region of 1 mm to 10 mm, a height of the sample observation zone as defined between a distance from the light source to an inlet surface of the lens body is in a range of 0.5 mm to 5 mm, preferably in a range of from 0.7 mm to 1.5 mm, and an outer diameter of an outlet surface of the lens body is in a range from 5 mm to 100 mm, preferably in a range of 10 mm to 20 mm.

In an embodiment, the microscope comprises a plurality of illumination and wave collection systems arranged for simultaneous observation of a plurality of containers of a multi container system.

In an embodiment, the lens further incorporates a beam splitter for splitting a reference forming beam from the sample beam.

In an embodiment, the lens comprises a semi reflective surface forming the beam splitter positioned between an upper portion and a lower portion of a body of the lens.

In an embodiment, the lens further comprises reference beam internal reflective surfaces comprising a first reflector and a second reflector configured to exit the reference forming beam out of a central portion of the lens arranged coaxially within a sample beam outlet surface of the lens.

In an embodiment, the detection system comprises a reference beam filter.

In an embodiment, the microscope comprises first and second mirrors configured to direct the reference forming beam exiting the lens to the reference beam filter.

In an embodiment, the reference beam filter comprises an optical fibre comprises a tapered entry portion and a signal mode fibre section, the tapered entry portion arranged to capture and funnel a beam spaced apart from a centre axis of the entry portion, for instance a beam rotating around said centre axis of the entry portion, into the single mode fibre section.

Microscope according to any preceding claim, wherein the illumination system is configured to emit light having a coherence length (Lc) of less than 300 μm and greater than 30 μm and the image sensor comprises a plurality of hardware encoded image sensing zones each representing a channel where a reference beam generated by the reference beam generation system interferes with the sample beam.

In an embodiment, the detection system comprises a fibre optical beam distributor on to which the reference beam is projected, the fibre optic beam distributor coupled optically to a plurality of positions on the image sensor corresponding to image sensor channels.

In an embodiment, the illumination system is configured to emit light having a coherence length (Lc) of less than 300 μm.

In an embodiment, the illumination system is configured to emit light having a coherence length (Lc) greater than 30 μm.

In an embodiment, the image sensor comprises a surface area greater than 1 mm, the microscope further comprising an optical path difference adjustment device (OPD), wherein the OPD is configured to dynamically adjust the optical path difference between the sample and reference beams to scan an image formed by interference between the reference and sample beams across the image sensor surface.

In an embodiment, the number of sample illumination beam sources arranged around the sample observation zone is in a range of 80 to 300.

In a preferred embodiment, the number of sample illumination beam sources arranged around the sample observation zone is in a range of 90 to 150.

In an embodiment, the illumination system comprises wave guides having wave guide outlets held in a wave guide support.

In an embodiment, the wave guide outlets held in a wave guide support positioned around the sample observation zone are configured to direct sample illumination beams at said beam inclination angle.

In an embodiment, the wave guides are formed within a wave guide support that houses the lens of the wave collection system.

In an embodiment, the light sources of the illumination system comprise a plurality of wave guides positioned around the wave collection system, coupled at an inlet end to the light generator configured to sequentially switch from one wave guide to the next to generate said moving sample illumination beam around the sample observation zone.

In an embodiment, the light generator comprises a MEMs device coupled to a switching module, configured to direct light into the input ends the wave guides.

In an embodiment, the illumination system comprises wave guides formed by Silicon Nitride within a wave guide support.

Further objects and advantageous features of the invention will be apparent from the claims, from the detailed description, and annexed drawings, in which:

FIG. 1a is a simplified schematic illustration of a sample container system and a portion of an optical diffraction tomography microscope according to an embodiment of the invention;

FIG. 1b is a simplified schematic illustration of a portion of the elements of FIG. 1a in cross-section;

FIG. 1c is a view similar to FIG. 1b for illustrating a range of displacement dx of a sample container system with respect to the microscope;

FIG. 4 is a simplified schematic illustration in perspective showing waveguides of an illumination system of an optical diffraction tomography microscope according to an embodiment of the invention;

FIG. 4a is schematic simplified detailed view of an outlet of a waveguide of the system according to FIG. 4 providing a collimated beam and FIG. 4b is a view similar to FIG. 4a of a variant;

FIG. 4c is schematic simplified detailed view of waveguides of an illumination system connected to a MEMS multi-inlet optical switch according to an embodiment of the invention;

FIG. 5 is a schematic view of a preferred embodiment where biological samples are measured while traveling within an immersed microfluidic channel;

FIGS. 9a to 9f illustrate graphically and schematically the construction of a 3D Refraction Index map from single holograms of an observed sample, in the Fourier Domain, using a microscope according to an embodiment of the invention;

FIG. 10a is a graphical illustration of a coherence length relative to a reference wave front in three different situations in off-axis digital holography;

FIG. 10b is a schematic graph showing a Fourier plane of the zero and first order, for three different illumination angles;

FIG. 12a is a view similar to FIG. 11a of yet another embodiment with a reference beam in an off-axis architecture;

FIG. 12b is a top view of a tapered optical fibre core for filtering a reference beam collected for different illumination conditions;

FIG. 12c is a simplified schematic side view of the tapered optical fibre of FIG. 12b;

FIG. 12d is a simplified graphical illustration of a 4-f optical setup, acting as an optical relay system, where the sample beam and a reference beam are shown in the intermediate image, the Fourier and the image planes;

FIG. 12e is a schematic simplified top view of a portion of a guided optics system showing a reference beam distribution and sample beam apertures located at the Fourier plane of the 4-f optical setup of FIG. 12d;

FIG. 12f is a schematic simplified perspective view of an optical waveguide network for splitting a reference beam of the guided optics system of FIG. 12e according to an embodiment of the invention;

FIG. 12g is a top view schematically illustrating an image sensor with a plurality of lenses and corresponding image sensors of the embodiment of FIG. 12a;

FIG. 12h is a schematic graphical illustration of the 4-f optical setup of FIG. 12d where multiple channels are visualized;

FIG. 12i is another schematical view of the 4-f optical setup of FIG. 12d where multiple channels are visualized and marginal rays are shown;

FIG. 13 is a simplified detailed schematic cross-sectional view of a portion of an optical diffraction tomography microscope according to another embodiment of the invention, showing another embodiment of a wave collection system with integrated beam splitter, to collect light from the sample beam in order to create a reference beam from it after filtering;

FIG. 16e is a schematic simplified representation of a hologram generated with a dual reference showing multiplexed information in a spatial domain;

FIG. 16f is a schematic graphical representation of a Fourier transform of a dual reference hologram showing the well separated orders of diffraction;

FIG. 17a illustrates a portion of an illumination system similar to FIG. 4c comprising N individuals light sources and FIGS. 17b, 17c, 17d illustrate flow diagrams of various illumination (shining) sequences of the individual light sources.

Figures 2A, 2B, 3:
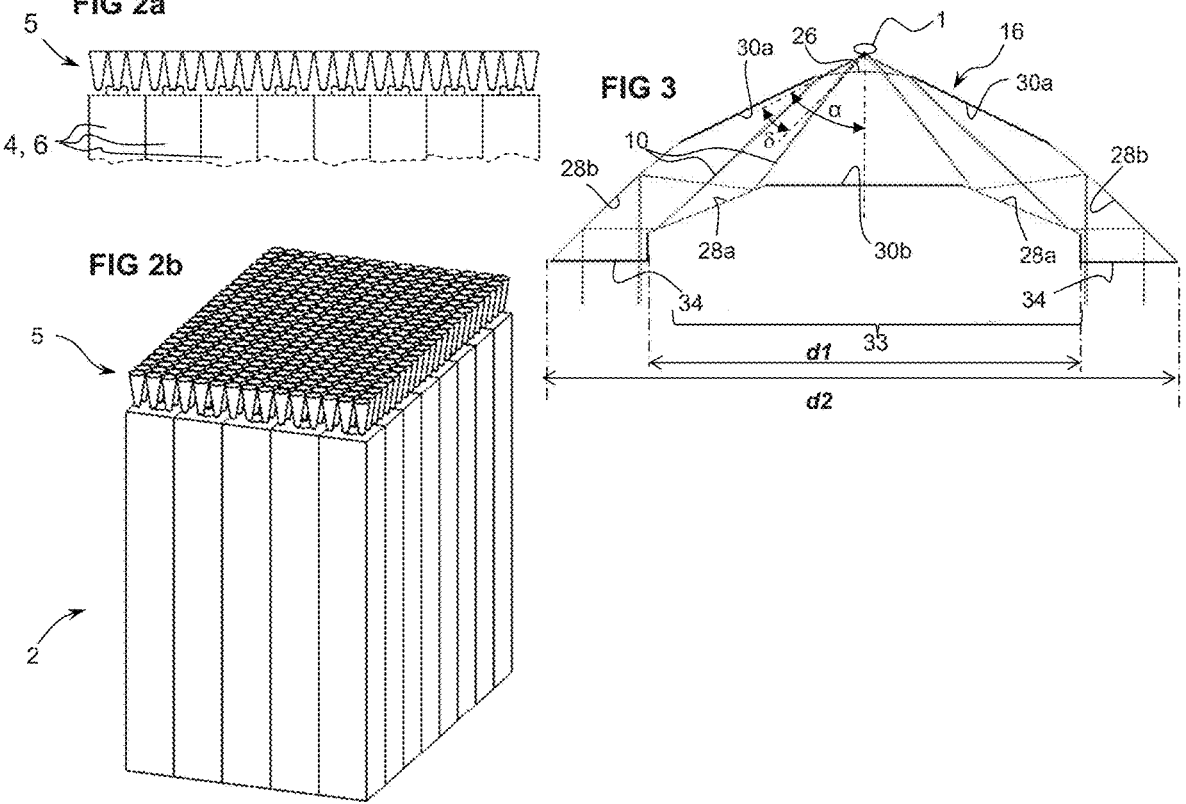
FIG. 2a is a view similar to FIG. 1a of another embodiment.
FIG. 2b is a schematic simplified illustration of the embodiment of FIG. 2a in perspective.
FIG. 3 is a schematic cross-sectional view of a lens of an optical diffraction tomography microscope according to an embodiment of the invention.

Referring to the figures, an optical diffraction tomography microscope 2 according to embodiments of the invention comprises an illumination system 4, a wave collection system 6 with an annular aperture featuring a central obscuration or inactive portion 33, a detection system 8, and a computation device 18 connected to the illumination system 4 and the detection system 8. The wave collection system with central obscuration thus forms an annular aperture wave collection system.

The computation device 18 controls the illumination system 4 configured to generate a substantially rotating sample illumination beam 10 (also named an object beam herein) around a sample observation zone 32 of the microscope without requiring a mechanically rotating light transmitter. The illumination system 4 arranged around the sample observation zone 32 may thus advantageously be mechanically static. The computation device further receives the output of the detection system 8 and comprises an image reconstruction processing module for holographic reconstruction of an image of an observed sample 1 in the sample zone 32.

The observed sample 1 may in particular comprise or consist of a biological sample such as a cell, a portion of a cell, a bacteria, or other forms of biological matter. Nevertheless, within the scope of the invention, the observed sample may be any type of living or non-living matter provided that it may be observed by transmission micros-copy, namely an illumination beam capable of passing through the sample.

In advantageous embodiments of the invention, the observed sample is a biological sample, including living biological samples such as living cells, that may be observed marker free (label free), namely without the presence of fluorescent or other forms of chemical markers that affect the biological sample. Nevertheless, within the scope of the invention, the observed sample may also be labelled with chemical markers.

The observed sample 1 may in particular be contained within a medium 3a within a sample container system 5. The medium is in many applications an aqueous medium although other mediums in liquid or gel or solid forms may be used depending on the application.

The sample container system 5, in advantageous embodiments, comprises a well plate comprising a plurality of sample containers or wells 7 within which a plurality of samples and mediums may be contained. For instance, the sample container system may comprise a well plate of standard dimensions used in the life sciences industry, for instance a 384 well plate. However, within the scope of the invention, non-standard well plates or multi container systems may be used without departing from the scope of the invention, also including single container systems.

Instead of a well type of container system, the biological sample may be positioned under a microscope coverslip.

In yet another embodiment, as schematically illustrated in FIG. 5, the sample may be positioned in a tube 7' extending through the microscope, in particular through the sample observation zone 32, whereby the medium within which the observed sample is found may flow through the tube. The direction of the flow can be inverted so the sample 1 can exit from the upper part where it has entered. In another embodi-ment the tube may exit at a back focal plane of the wave collecting system 6, thus avoiding disturbing the imaging process.

In advantageous embodiments, a medium 3b may be present around the well 7 or tube 7' or other container system within the sample observation zone 32, the medium 3b outside the container but within the sample observation zone being configured to adjust the refractive index and thus the path of the sample illumination beam 10 extending through the observed sample 1 to the wave collection system 6 and greatly reduce OPL variations and optical aberrations induced by optical surfaces crossed by the light beams.

In preferred embodiments, the medium 3b outside the container has identical or similar properties to the medium 3a within the container in order to have the same or very similar refractive index.

Figures 7A, 7B:
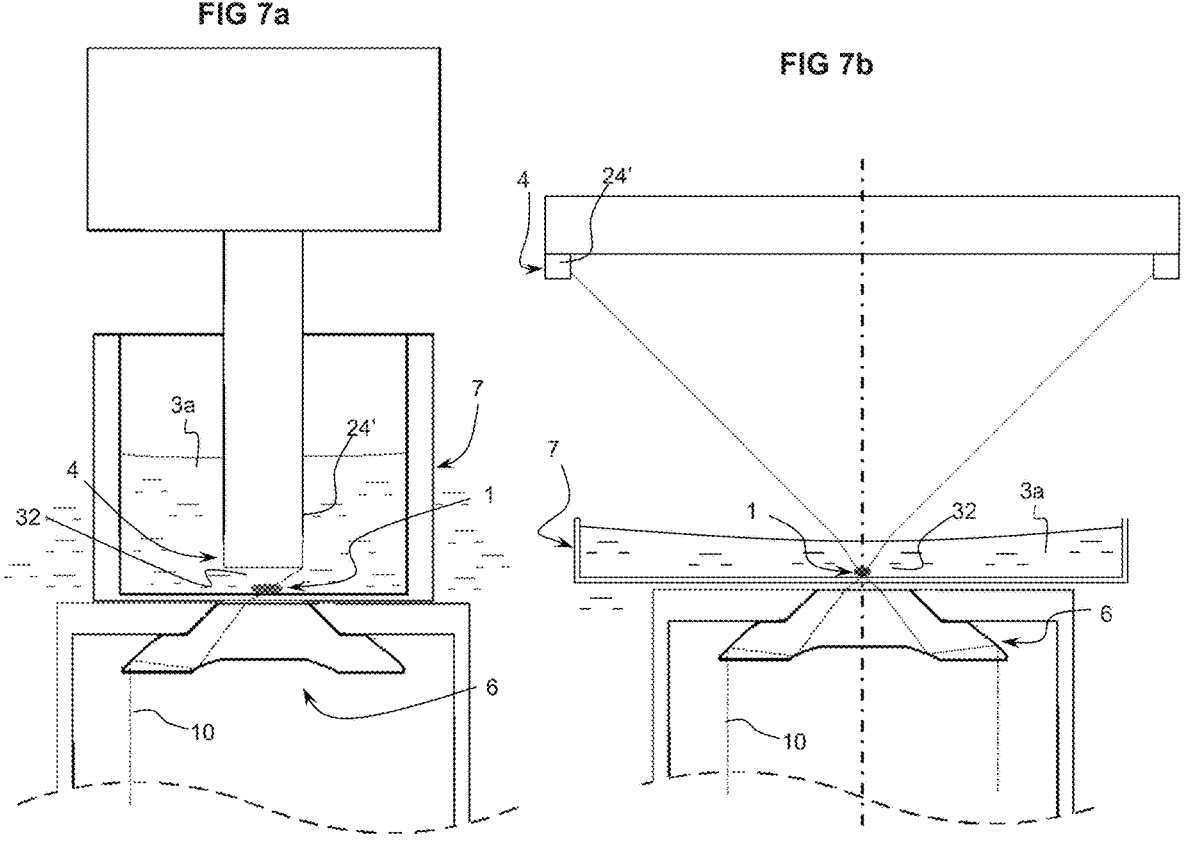
FIG. 7a is a simplified schematic illustration of a sample container and a portion of an optical diffraction tomography microscope according to an embodiment of the invention where the illumination system is decoupled from the microscope.
FIG. 7b is a simplified schematic illustration of a sample container and a portion of an optical diffraction tomography microscope according to yet another embodiment of the invention where the illumination system is decoupled from the microscope.

FIGS. 7a and 7b illustrate a sample container 7 and a portion of an optical diffraction tomography microscope according to embodiments of the invention where the illu-mination system 4 is decoupled from the wave collection system 6 of the microscope. The waveguides are mounted on a separate waveguide support 24' device positioned above the sample 1.

In the embodiment of FIG. 7a, a portion of the waveguide support 24' may be dipped into the sample container. This embodiment is particularly interesting for the use case where imaging dishes are used. Moreover, this approach is inter-esting to platforms up to 96 well-plates as the waveguide illumination head may have waveguide supports ranging for instance from 3 mm to 20 mm in diameter.

In the embodiment of FIG. 7b the waveguide support remains above the surface of the liquid medium 3a in the sample container 7. This is an interesting setup when imag-ing individual or multiple dishes or other microfluidics vessels. This configuration may also be used for imaging a sample in a cover slip. This setup is also particularly suitable for using a top-stage incubator as more space is available between the illumination source and the wave collection device 6.

The illumination system according to embodiments of the invention comprises a plurality of wave guides 12 having wave guide outlets 20 positioned around the sample obser-vation zone 32 and configured to direct a collimated and aberration-free sample illumination beam 10 through the observed sample 1 and into the wave collection system 6 at an angle β with respect to the center axis A extending through the center of the sample observation zone 32.

The Rayleigh range of a Gaussian beam is defined as following:

$$Z_R = \frac{\pi \omega_o^2}{\lambda}$$

where $\omega_o$ is the beam waist and $\lambda$ the light source wave-length.

We consider here Gaussian beams with a Rayleigh dis-tance ranging from 1 mm to 500 mm, preferably between 20 and 200 mm, ideally around 100 mm.

The angle β is advantageously within a range of 40° to 80°, preferably in a range of 60° to 80°, for instance around 62° to 68°.

The number of wave-guides 12 surrounding the sample zone 32 is advantageously more than 10, preferably more than 40, for instance between 90 and 120. The latter number of wave guides allows to generate discrete positions for a rotating sample illumination beam that allows to generate a hologram of the observed sample of high resolution.

The illumination sources such as the wave guide outlets 20 may be positioned around the sample observation zone 32 in circular or ring arrangement in preferred embodiments.

In embodiments of the invention, the wave guides may be in the form of wave guide channels 22 formed within a wave guide support 24, for instance by photonics integrated cir-cuits techniques such as the all-nitride-core technology.

In other embodiments, the wave guides 12 may be in the form of optical fibres that are inserted or formed within a support, for instance a molded plastic support.

In other embodiments, the illumination system 4 may comprise a plurality of light generating components mounted directly in a support surrounding the sample illu-mination zone 32 (variant not illustrated).

In other embodiments, the illumination system 4 may comprise a plurality of waveguides superimposed along the optical axis of the collecting lens in order to generate multiple sample illumination zones 32. A variable lens can be added in the light collection device in order to adjust slightly the position of the sample plane and image thus at different coordinates along the optical axis.

In the illustrated embodiment, the wave guides 12 extend from the sample observation zone 32 to at least one light generating device 35 positioned distal from the sample observation zone, for instance. The light generating device may for instance comprise a MEMs system (schematically illustrated in FIG. 4c) coupling light to input ends of the wave guides 12 in a switched manner so as to illuminate the wave guides sequentially in a rotating fashion. Alternatively, each input end of the wave guides may be individually coupled to a light generating source such as a laser diode or a superluminescent light emitting diode (SLED).

It may be noted that the wave guides may be illuminated sequentially in various orders and patterns in coordination with the computation device 18 for image reconstruction depending on the sequence of switching of the individual wave guides 12.

FIG. 17a illustrates a portion of an illumination system comprising N individuals light sources and FIGS. 17b, 17c, 17d illustrate flow diagrams of various illumination (shining) sequences of the individual light sources. For instance, it can be chosen to activate the sources sequentially, one after the other, or every n positions, in a clock-wise or anti clock-wise manner. A hologram set is thus constituted by N holograms or N/n holograms if a faster mode is wished. It is also valuable to acquire m×N holograms (m being greater than 1) in order to further reduce the noise. A random pattern is also a possible choice.

It may be noted as well that a plurality of light sources of different wavelengths for instance can be used and shined simultaneously to generate holograms spectrally multiplexed.

The wave guide outlet 20 may comprise a lens 38 configured to focus the sample illumination beam exiting from an end of an optical fibre 40 of the wave guide channel 22.

The light source 35 may have a coherence length in the range of 50 um to 300 um preferably in a range of 50 um to 200 um, for instance around 100 um.

The sample illumination beam 10 may typically have a beam waist diameter in the range of 50 μm to 400 μm, preferably in a range of 75 μm to 300 μm, for instance around 150 μm.

The wave collection system 6 in a preferred embodiment may be in the form of a catadioptric centrally obscured lens positioned below the sample zone 32 of the illumination system 4.

The wave collection system 6 has an annular aperture defined by a central obscuration 33, or inactive central area 33, configured to provide a high NA (Numerical Aperture) while being easy to optimize and manufacture as it presents less surface than an unobscured microscope objective.

The main advantage to use this kind of wave collection system, compared to an unobscured objective with same NA, is the fact that it can be used for tomographic systems with very low loss of axial resolution and no loss of transverse resolution as the lateral frequencies can be collected by the rotational scanning (statically or dynamically) of the illumination beam. The collection NA is designed to collect the beam shining through the sample and the diffracted beam by the sample.

Figure 8A:
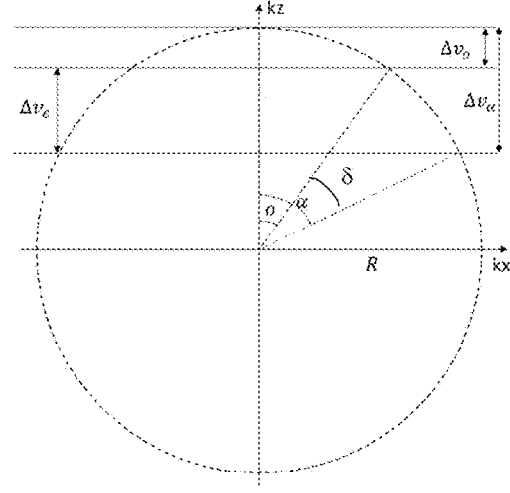
FIGS. 8a and 8b are graphical representations of a resolution of a microscope according to embodiments of the invention as a function of the annular aperture angle of frequency collection of the lens of an optical diffraction tomography microscope according to an embodiment of the invention.
Figure 8B:
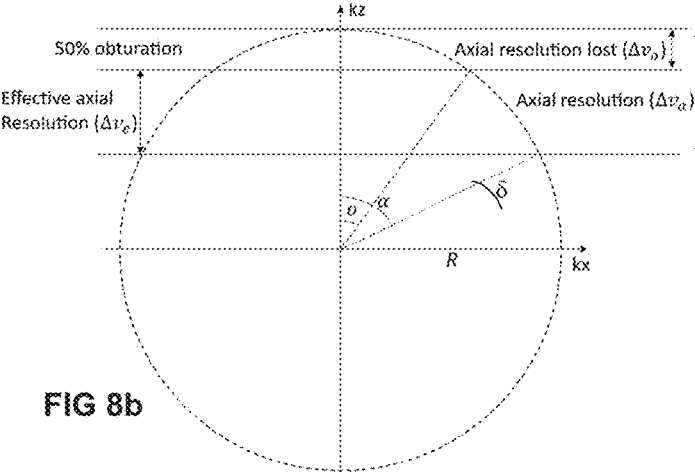

Using the McCutchen formula, the equation governing the axial resolution of a microscope objective with a central obturation is the following, $\Delta v_e = \Delta v_\alpha - \Delta v_o = R(\sqrt{1-\sin^2 o} - \sqrt{1-\sin^2 \alpha})$, where $$R = \frac{n}{\lambda},$$

α and o are the angles corresponding to the Numerical Aperture angle and obscuration respectively (FIGS. 8a and 8b). The Numerical Aperture NA is defined by:

$$NA = n \cdot \sin(\alpha)$$

n being the refractive index of the immersion liquid.

It is interesting to increase the NA as much as possible to reduce the axial resolution loss only related to the obscuration size and increase the lateral (transversal) resolution.

The centrally obscured lens may comprise an essentially axisymmetric lens body 16 with a center axis aligned with the center axis A of the illumination system 4 corresponding to a center of rotation of the sample illumination beam 10 generated by the illumination system 4. The lens body 16 comprises an inlet surface 26 through which the sample illumination beam enters, internal reflective surfaces 28, internal inactive surfaces 30 and an outlet surface 34 through which the sample illumination beam exits. The internal reflective surfaces 28 comprise a first reflector 28a and a second reflector 28b. The first reflector 28a receives incident light emitted from a wave guide outlet 20 through the sample observation zone 32 and inlet surface 26, the sample illumination beam incident on the first reflector 28a being reflected onto the second reflector 28b, and the sample illumination beam incident on the second reflector being reflected out through the outlet surface 34 into the light detection system 8.

The position and angles of the first reflector and second reflector are configured for collecting the sample illumination beams emitted from the illumination system 4 through the sample observation zone taking into account the refractive indexes of the walls 9a, 9b of the sample container system 5, of the mediums 3a, 3b, and of the observed sample 1.

The angle β of the sample illumination beam 10 entering the inlet surface, relative to the center axis A is, in preferred embodiments, in a range of 40° to 80°, in particular in a range from 60° to 75°, for instance around 62° to 68°. The large angle advantageously confers the wave collection system 6 with a high numerical aperture.

At least one inactive surface 30 is arranged at a center of the lens body 16. The lens with central inactive surface thus forms an annular aperture lens. The inactive surfaces may in advantageous embodiments be provided with a light absorbing material in order to reduce internal reflections or to reduce stray light passing through the lens outside of the outlets.

The internal reflective surfaces 28 may be provided with a reflective coating such as a metallized surface, and/or may be reflective due to the angle of incidence of the sample illumination beam taking into account the refractive index of the lens body with respect to the environment, in particular air.

The internal inactive surfaces 30 comprising at least a central inactive surface 30a may be coated with an absorbent material however in variants the inactive surfaces may be uncoated and allow transmission of light therethrough.

The sample illumination beam angle range reflected by the wave collection system, avoiding capture across a center of the lens, reduces the active surface area of the lens thus reducing manufacturing requirements for obtaining a sufficiently accurate surface geometry of the active parts of the lens.

A further advantage of the catadioptric configuration of the lens, in addition to the high numerical aperture and reduced manufacturing tolerances of the lens geometry, is the ability to position components of the illumination system, detection system, or wave collection system, within the central region covered by the central inactive surface. Moreover, the lens can be placed very close to the sample zone 32 and therefore to the observed sample 1, reducing the transmission length of the sample illumination beam through the medium 30a, 30b as well as providing for a high angle α with respect to the center axis A. The close position of the lens 16 to the observed sample 1 also allows the lens to be very compact. A compact lens configuration reduces manufacturing costs but also allows a plurality of illumination and wave collection systems 4, 6 to be arranged adjacently, or in close proximity, for measurement of a plurality of samples simultaneously.

Figures 6A, 6B:
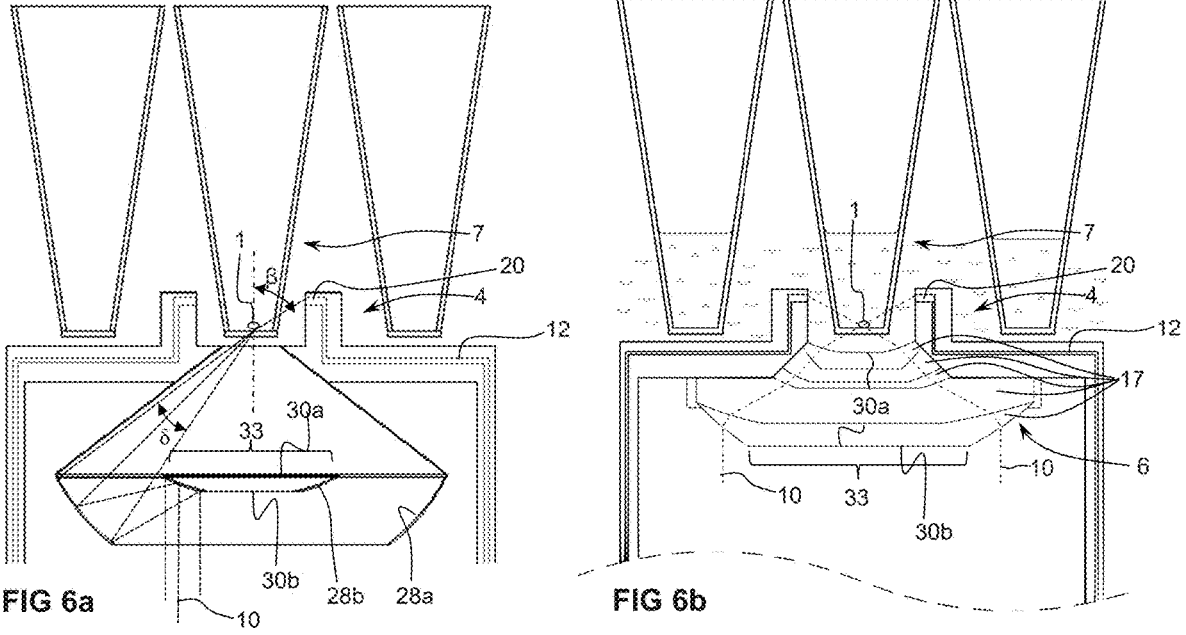
FIG. 6a is a view similar to FIG. 1b of another embodiment of the invention.
FIG. 6b is a view similar to FIG. 1b of yet another embodiment of the invention.

FIG. 6*b* illustrates a refractive wave collection system 6 with an annular aperture (central obscuration). The lens body may comprise between two or more layers 17, for instance up to twelve layers, of optical materials (glasses or other light transmissive materials) with different refractive indexes, and optionally different Abbe numbers. The number of layers depends on the numerical aperture (NA) and central obscuration radius of the system in order to have the optical aberrations corrected. Instead of distinct layers, an optical material with a progressively varying refractive index may also be used. The central inactive (obscuration) surface 30*a* may be at a single surface or multiple surfaces between layers to improve the absorption of undesired light rays at the center of the lens.

As best illustrated in FIG. 1*c*, the illumination and wave collection system 4, 6 relative to the sample container system 5 is movable in a plane X, Y orthogonal to the direction Z of the central axis A so as to allow positioning of the observed sample 1 within the path of the generated sample illumination beams 10 that rotate around the center axis. The sample observation zone 32 thus has a diameter sufficient to allow a certain adjustment of the position in the X, Y plane of the sample container such that observed samples 1 (such as cells positioned within the sample container) may be moved to a precise position (i.e. along the center axis) for the sample illumination beam 10 to pass therethrough. The diameter of the range of movement is indicated as dx in FIG. 1*c* whereby dx may be substantially equal to an inner diameter of sample container well 7 such that samples positioned at any position on the bottom wall of the sample container may be observed.

Typically, the sample container 5 will be mounted on a sample stage that is movable in two or three directions X, Y, Z for positioning the height and the lateral position of the wells with respect to the optical diffraction tomography microscope 2. The sample stage is also configured to allow the microscope to be moved from one container to other containers of the well plate.

A further advantage of the illumination and wave collection system according to embodiments of the invention is that, in view of the compact arrangement and short sample illumination beam path from the illumination system to the outlet 34 of the lens, light with a lower degree of temporal coherence may be used compared to conventional coherent light beam microscopes, without deterioration of the image quality.

Although a single hologram ring 13 captured by the detection system 8 from a sample illumination beam 10 generated by one wave guide 12 has a low resolution (because some image information, i.e. frequency content, is not captured in the central obscuration), the addition of the holograms 11 generated from the light beams coming from all the other wave guides situated around the sample observation zone, allows to capture and fill the missing information so as to obtain a high resolution image, as schematically illustrated in FIGS. 9*a* to 9*f*. There is a compromise between the number of acquired holograms and the diameter d1 of the central obscuration or central inactive area 33 relative to the outer diameter d2 of the lens, the higher the ratio of obscuration d1/d2, the more holograms are needed to fulfill the synthetic bandpass governing the resolution. Moreover, the SNR (Signal to Noise Ratio) can be improved as more holograms are acquired.

The annular aperture of the wave collection system 6 may be characterized by the diameter d1 of the central inactive area 33 and the outer diameter d2, or by the sample beam capture angle δ and numerical aperture angle α in the lens body. In embodiments of the invention the sample beam capture angle δ is in a range of 1° to 60°, preferably in a range of 5° to 30°.

It may be noted that the acquisition of between 20 and 200, for instance around 100 holograms, from an equivalent number of wave guides 12 positioned around the sample observation zone 32, allows to generate 3D Refractive Index (RI) maps of high resolution.

In an embodiment, for multi-container systems, dimensions of the microscope may have the following values.

A diameter of the sample observation zone (32) bounded by the illumination system 4 is in a region of 1 mm to 10 mm.

A height of the sample observation zone as defined between a distance from the light source to an inlet surface 26 of the lens body is in a range of 0.5 mm to 5 mm, preferably in a range of from 0.7 mm to 1.5 mm.

In certain embodiments, an outer diameter of an outlet surface 34 of the lens body 16 may be in a range from 5 mm to 100 mm, preferably in a range of 10 mm to 20 mm.

Referring in particular to FIGS. 10 to 16, a detection system 8 according to various embodiments of the invention will now be described.

Figures 14A, 14B, 15:
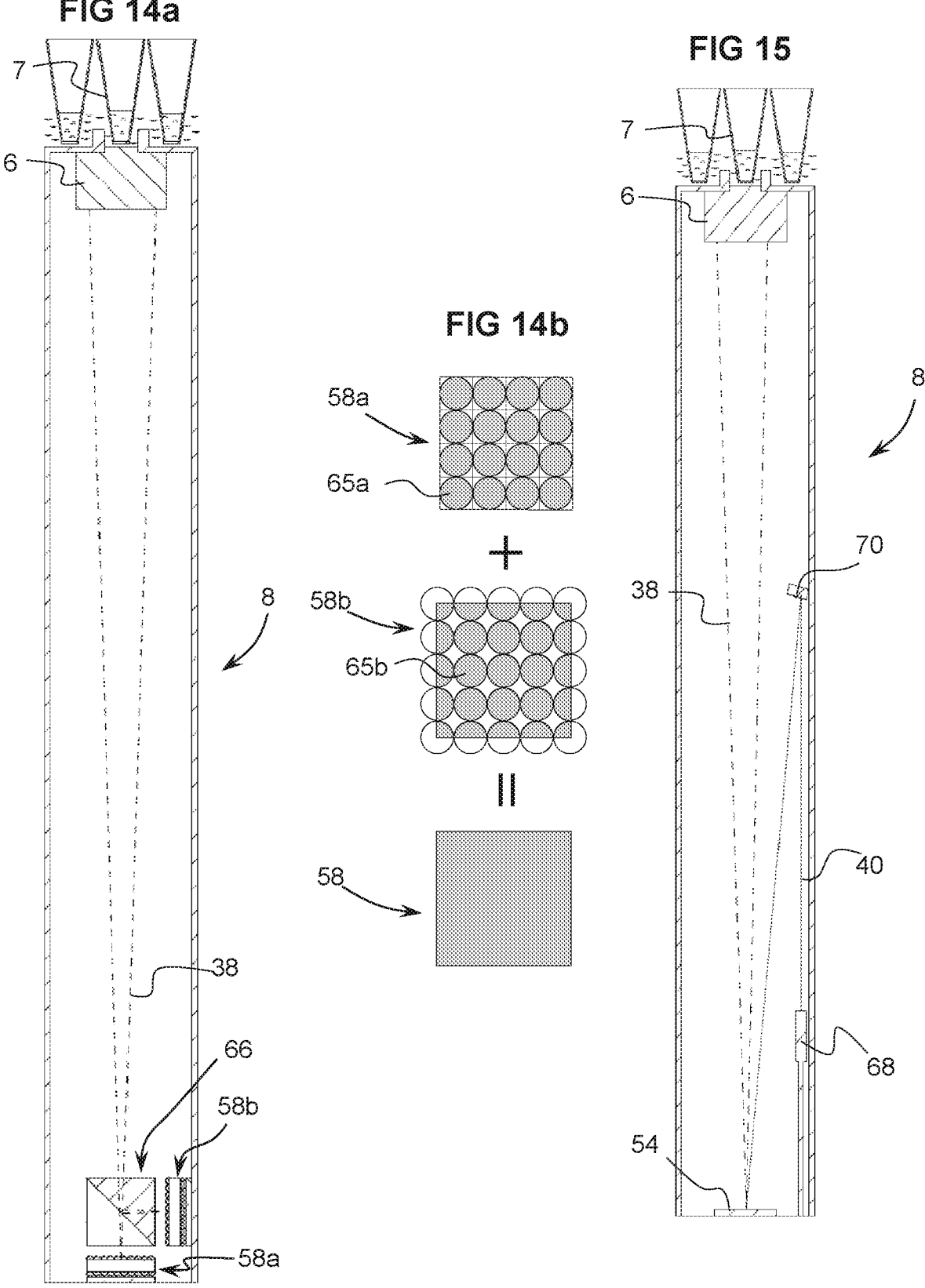
FIG. 14a is a view similar to FIGS. 10 to 12a of yet another embodiment.
FIG. 14b illustrates the footprint of sample beams on first and second image sensors with offset positions sized to cover the full image by overlapping relationship of the footprints in vignetted surface areas.
FIG. 15 is a view of yet another embodiment with a detection device that is not a common path detection device and thus having a separate reference beam.

Embodiments illustrated in FIGS. 11*a*, 12*a*, 14*a* and 16*a* have a common path detection device (meaning that a reference beam, needed for the holographic detection, is created by taking a fraction of the sample beam and filtering it) 36 whereas the embodiment of FIG. 15 does not have a common path detection device, rather has separate sample and reference beams from the source.

Figures 11A, 11B:
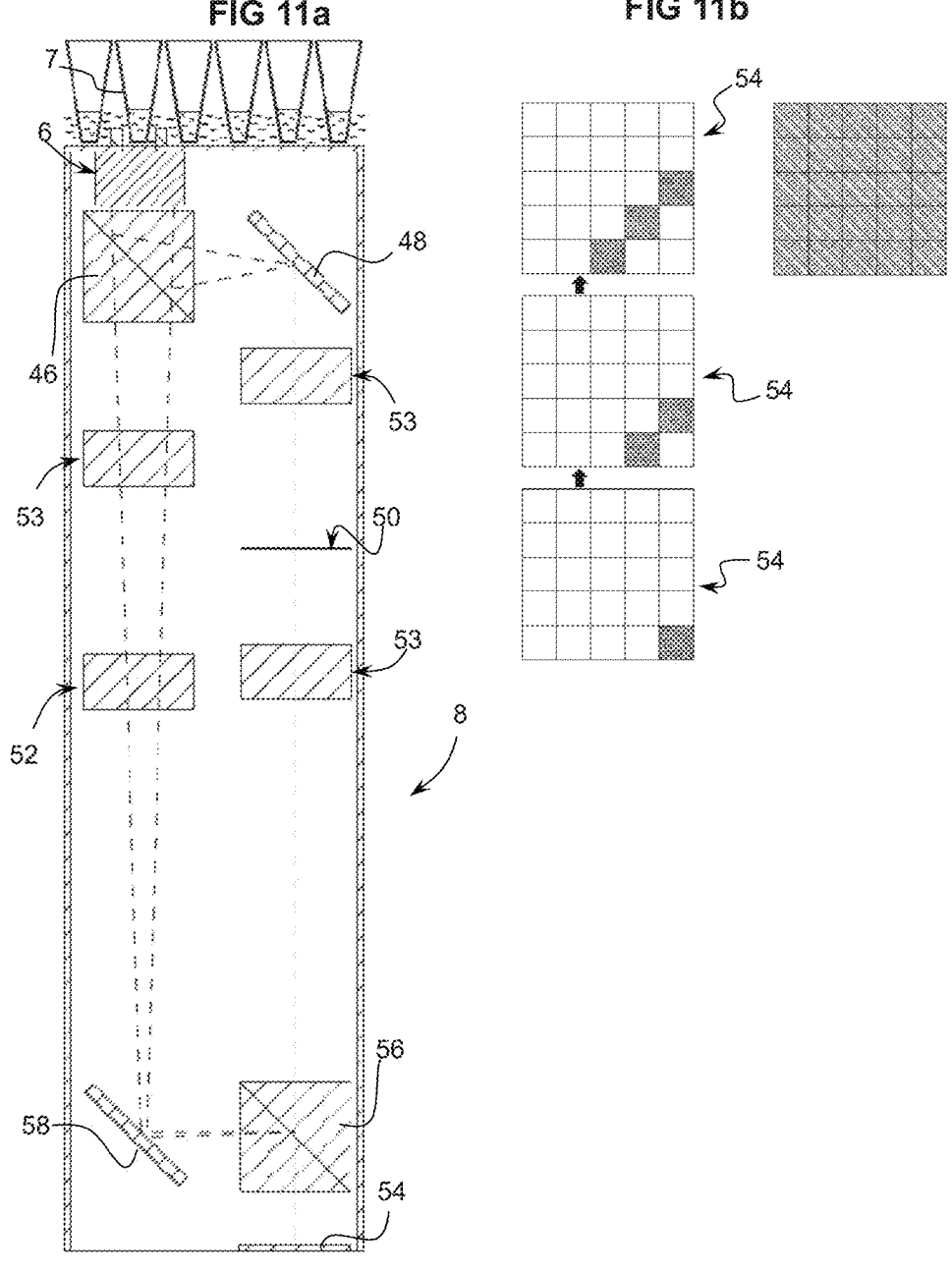
FIG. 11a is a simplified schematic illustration of an optical diffraction tomography microscope according to an embodiment of the invention, in particular showing a detection system with a common path detection device according to a first embodiment of the invention.
FIG. 11b is a schematic representation of an image sensor illuminated by a sample and a reference wave, where the zero OPD is scanned across the sensor, according to an embodiment of the invention.

Referring to FIG. 11*a*, a first embodiment of a detection system 8 is illustrated. In this embodiment, the detection system comprises a first beam splitter 46 arranged downstream of the wave collection system 6 configured to split the sample illumination beam 10 into a reference beam path 40 and a sample beam path 38. The reference beam and/or sample beam may pass through an optical path difference (OPD) compensation system 52 in order to adjust the optical path length of the reference and/or sample beam. The OPD compensation system may be formed for instance by at least one block of a transparent material that may for instance be tilted to increase or decrease the optical path of the beam, such blocks used by pair can adjust the OPL without introducing any walk-off. Mirrors 48, 58 may be provided to redirect the sample beam, respectively reference beam, towards a beam combiner 56 where the sample and reference beams are joined together and directed towards an image sensor 54.

The reference beam in the embodiment of FIG. 11*a* passes through a reference beam filter that may for instance be in the form of a pinhole that allows the zero order Fourier wave component to pass therethrough and to filter out the higher order wave components. The reference beam and sample beam mirrors 48, 58 respectively may be tiltable mirrors for instance in the form of electronically controlled MEMS components (such components being per se well-known in optical systems) to adjust the angle of the sample and reference beams as a function of the angle of rotation of the sample illumination beam 10. In other words, as the sample illumination beam 10 rotates around the sample 1 in the well 7, the mirror 48 tilts in order to direct the reference beam through the pinhole filter 50 and respectively the sample beam mirror 58 tilts in order to direct the sample beam towards a fixed point in the beam combiner 56 where it joins the reference beam passes therethrough.

As best illustrated in FIG. 10*a*, the illumination light source may have a coherence length Lc which does not allow to generate fringes over the whole sensor in an off-axis holography configuration. In order to obtain a complete image with high resolution over the entire coherence length of the sample beam, the optical path difference between the sample and reference beams is dynamically adjusted to scan an image formed by interference between the reference and sample beams across the sensor surface, for instance as illustrated in FIG. 11*b*, in order to cover the entire sensor surface. In this illustration, the scan is performed diagonally across the pixels of the image sensor.

Referring now to FIG. 12*a* to 12*g*, another embodiment of a detection system 8 is illustrated and shall now be described. In this embodiment, the reference beam 40 is obtained by filtering the zero order wave component of the Fourier transform by means of a single mode optical fibre 50*a*. The optical fibre 50*a* may advantageously comprise a tapered entry portion 51 that captures the rotating reference beam before funneling it into the signal mode fibre section 50*a*. In this embodiment, no tilting mirror is required to compensate for the rotating sample from which the reference beam is separated. It may be noted that the reference beam filter 50 of this embodiment may also be used in the embodiment of FIG. 11*a* in replacement of the pinhole filter, whereby in such case the mirror 48 does not need to be dynamic, but may be a static mirror.

In the embodiment illustrated in FIG. 12*a*, the sample beam and reference beam are separated from each other by a beam splitter that in this embodiment is incorporated within the wave collection system 6 and in particular within the lens body 16.

As best seen in FIG. 13, the lens body may be provided with a sample beam internal reflective surface 28 with a first reflector 28*a* and second reflector 28*b* similar to embodiment of FIG. 3. But in addition a further reference beam internal reflective surface 29 comprising a first reflector 29*a* and a second reflector 29*b* is provided. The lens body comprises two portions, an upper portion 16*a* and a lower portion 16*b* that are separated by a semi reflective surface 31 that acts as a beam splitter. The two lens body portions may for instance be bonded together using per se well known techniques employed in the manufacture of conventional beam splitters. The beam splitter reflective surface 31 reflects a portion of the sample illumination beam 10 towards the reference beam internal reflective surfaces 29*a*, 29*b*, and allows a portion of the sample illumination beam to pass through to be reflected of the sample beam internal reflective surfaces 28*a*, 28*b*. In this embodiment, the reference beam exits the lens body at the center thereof and coaxially therearound the sample beam 38 exists the lens body. The reference beam 40 is redirected by first and second mirrors 48*a*, 48*b* towards the reference beam filter 50.

If the reference beam filter 50 comprises a pinhole lens, either one or both of the mirrors 48*a*, 48*b* may be tilting mirrors that redirect the rotating reference beam accurately onto the pinhole lens.

In the embodiment illustrated in FIGS. 12-12*c*, in view of the tapered optical fibre, the mirrors may be static.

Advantageously, incorporation of the beam splitter within the wave collection lens body 16 provides for a compact and economical arrangement.

In the embodiment illustrated in FIGS. 12*a* to 12*h*, the reference beam 40 may be projected or coupled to an optical fibre beam distributor 60 for projection on the image sensor 54 at a plurality of fixed positions 64 corresponding to the footprints of individual image sensor channels 65 forming a plurality of image sensors capturing the sample beam 38. A micro lens 62 positioned above each image sensor channel 65 may be provided to focus the sample beam on the footprint of the image sensor channel 65.

FIG. 12*h* graphically depicts formation of a hologram by the combination of the sample beam and the reference beam which is brought to the Fourier of the relay system plane by waveguides. The curvature of the aberration related to the difference of curvature of the two interfering waves (reference beam and sample beam) is compensated in this configuration because the initial points of the sample beam and reference beam are located at the same Fourier plane (therefore the beams will interfere having the same wavefront curvature at the image capture plane).

Figures 16A, 16B, 16C, 16D:
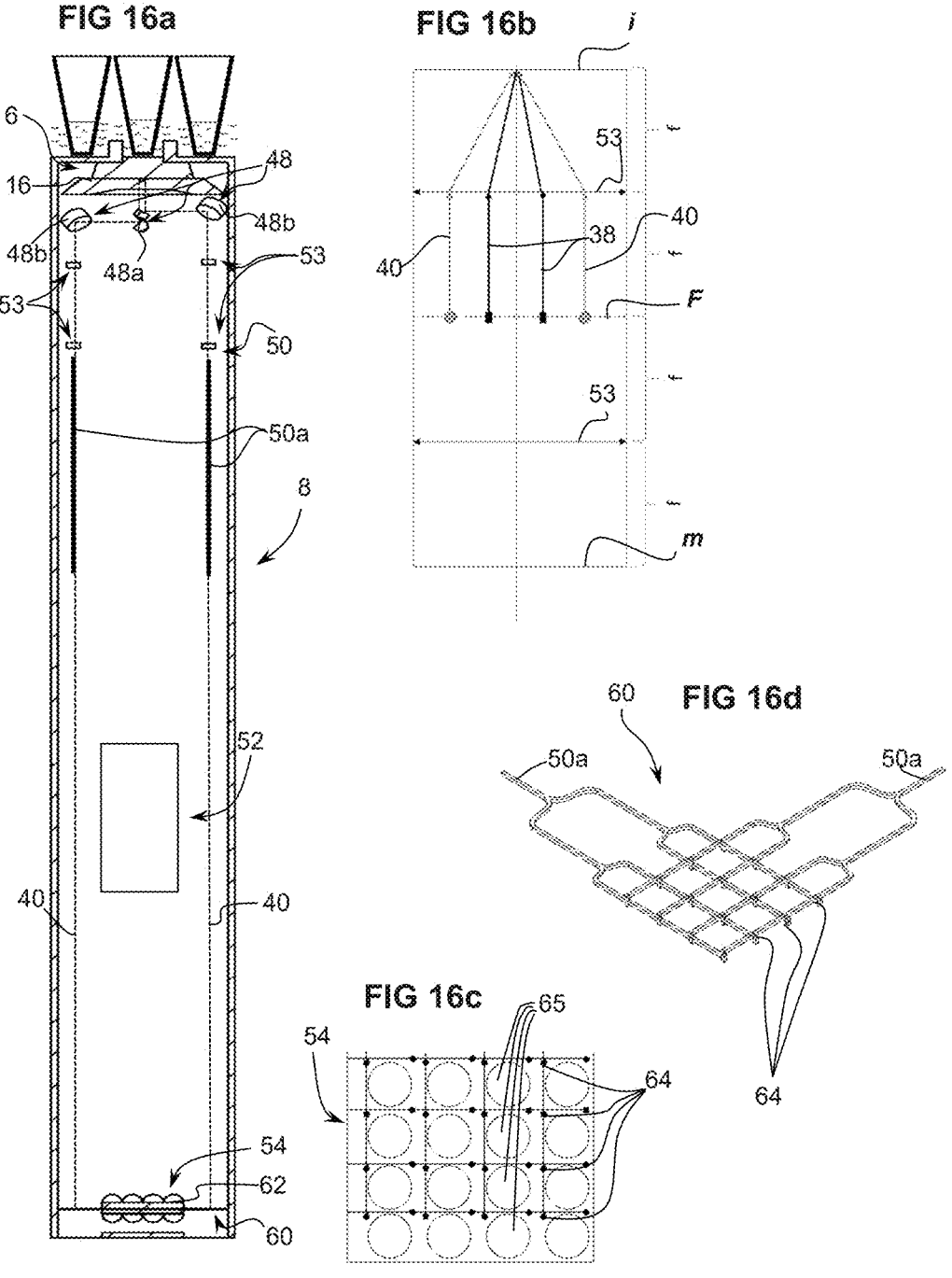
FIG. 16a is a view similar to FIG. 12a of yet another embodiment of the invention with a plurality of reference beams in a multiple off-axis architecture.
FIG. 16b is a simplified graphical illustration of a 4-f optical setup, similar to FIG. 12d, where a sample beam and multiple off-axis reference beams are shown in a Fourier plane and an image plane.
FIG. 16c is a view similar to FIG. 12e showing the distribution of optical guides placed in the Fourier plane of a system to generate a multiplexed dual reference beam off-axis holographic detection.
FIG. 16d is a view similar to FIG. 12f showing an optical waveguide network for splitting two reference beams of the guided optics system of FIG. 16c according to an embodiment of the invention.

The reference beam can be distributed using photonics integrated technologies, for instance based on silicon nitride. An example of circuit is represented in FIGS. 12*f* and 16*d*, where the waveguides are located at a precise position and the beam splitting is designed so to provide the required amount of light at the output.

In this embodiment the plurality of image sensors 65 represent a plurality of hardware encoded channels where a plurality of reference beams interfere with the sample beam such that a sample illumination source with a relatively low coherence length can advantageously be used to form a high resolution image of the refractive index distribution of the sample to be observed.

The fixed plurality of sensor channels according to an aspect of the invention is an advantageous alternative to the scanning of the OPD across an image sensor.

It is advantageous to use a multichannel solution (i.e. an image sensor with a plurality of image sensing zones each representing a channel) inter alia because one can obtain coherence of the resultant combined sample and reference beams all over the image sensor 54 simultaneously, whereby it is possible to compensate the optical path difference (OPD) precisely by adjusting the optical path length (OPL) of the reference beam individually at each channel. The number of channels necessary is inversely proportional to the coherence length of the light source. The lower the light source coherence length, the higher the number of channels needed.

The multichannel embodiment thus advantageously allows the acquisition of the image in one single shot with high resolution yet using a low coherence source. The use of a low coherence light source is very advantageous as it reduces speckle noise and the coherent noise generated by the multiple reflections between the different surfaces. Therefore, the technical constraints required for lenses, mirrors and other optical components when using high coherence light are reduced for low coherence light.

It is advantageous to use a multichannel image sensor with an array of fibres or waveguides to generate and compensate the OPD for each individual channel. It may be necessary to take two or more shots, even with the multichannel micro lenses, in order to retrieve the whole information of the FOV (Field of View). In an embodiment, mechanical baffles between channels may be provided to prevent optical cross-talks between the different channels.

The OPD adjustment may be performed by a pivotable block of glass to correct the OPD difference between the sample and reference beams.

It is advantageous to use a 4f optical system (see FIG. 12$d$) to conjugate the intermediate image plane m to the final image plane i (where the sensor is placed), passing through lenses 53 and the Fourier plane F. In this way, the curvature of the Gaussian beam is also matched as it is conjugated far away from the image plane.

It is advantageous to separate the reference beam filtering and the OPD correction systems.

As mentioned previously, the beam filtering can be done using a tapered fiber 51 with a single mode region 50$a$ as it is a compact, efficient and rotational invariant solution. The OPD correction may be done by precisely adjusting the OPL of each waveguide correspondent to its specific channel.

In an embodiment, it is advantageous to focalize the light into the tapered fibre. The combination of a pivotable (e.g. MEMS) mirror 48$b$ and a lens 53 to accurately steer and collimate the beams coming from different angles is advantageous to ensure energy efficiency.

Referring to FIGS. 12$d$ and 12$e$, the waveguides 64 transporting the different reference beams, in the Fourier plane F of the relay system, for instance a 4f system, have very small dimensions (for instance ~1 µm) and won't interfere on the imaging of the object. Although the area of coherence of each channel is small, the signal can be reconstructed by knowing the carrier wave characteristics and applying per se known image processing techniques. The global image shall be retrieved by stitching together the outcomes of the individual channels The embodiment of FIG. 12$a$ presents a compact setup as the central zone of the lens body 16 may be used to create the reference beam using a beam splitting reflective surface. The central volume within and below the lens body 16 that is not within the path of the rotating sample beam 38 can accommodate many different optical configurations for creation and filtering of the reference beam.

The coupling efficiency of the reference beam directed into the single mode fibre depends inter alia on the lateral shift of the incoming beam from the center of the fiber, the length of the tapered region, the core-cladding refractive index difference and the tapering ratio (angle). A MEMS mirror and afocal de-magnification system 48$b$, 53 provides an advantageous configuration in order to couple the reference beam into the tapered fibre.

The efficiency of filtering the reference beam depends on the length of the waveguide (at least 1000 wavelengths is needed for an efficient filtering), the fibre core radius, the geometry of the core and the core-cladding refractive index difference.

In an embodiment, it is advantageous to have an input core radius of between 30 µm and 300 µm, for instance about 100 µm, a Single Mode core diameter of between 2 µm and 5 µm, for instance about 3 µm, a tapered length of between 3 mm and 20 mm, for instance about 15 mm, and a single mode length of about 1 mm to 50 mm, for instance about 5 mm.

It is advantageous to use an adiabatic tapered fibre as it enables the reference beam generation and filtering to be rotationally invariant thus simplifying the mechanical and electronic control of the detection system.

The mirror 48$b$ may advantageously be a pivotally adjustable mirror, for instance a MEMS component, configured to precisely adjust the best entrance angle at the reference beam filtering device 50 (Pinhole, Tapered Fibre or Volume Bragg Grating).

Compared to a detection system with separately formed reference and sample beams at source, a common-path configuration has an advantage of a better control of the polarization of sample and reference beams, as the polarization can be maintained by using components with similar reflection and transmission Fresnel coefficients.

In embodiments, it is advantageous to use a light source that does not present periodic peaks of coherence like Laser Diodes do. Ideally, the gain process is for instance based on a single amplification of the ASE (Amplified Spontaneous Emission) as given by the super luminescent diodes. In this way, there is no optical feedback in the diode cavity, no Fabry-Perot modes and therefore no secondary peaks. It is advantageous to use light sources that do not present secondary peaks of coherence as less noise will be added due to ghost reflections from the all the microscope lenses.

It is advantageous to split the reference beam, which comes from the sample beam, into multiple beams to multiplex the object (i.e. sample) information spectrally in the Fourier domain and superimpose holograms obtained with slightly different off-axis conditions on the sensor. This can be done to pack more information for different OPL (Optical Path Lengths) in the Fourier Plane, as there is no overlap of the phase information in the Fourier Plane (see FIG. 16$f$), if the proper spatial frequency and direction is chosen.

Referring now to FIGS. 14$a$ and 14$b$, in this embodiment the detection system comprises two sets of image sensors 58$a$, 58$b$. In the illustrated embodiment, the image sensors are arranged orthogonally, however could be arranged at other angles with respect to each other. A beam splitter 66 splits the sample beam 38 into two parts, one for each image sensor 58$a$, 58$b$. The image sensors 58$a$, 58$b$ are offset in such a manner that the individual image detectors overlap each other's active portions to thus cover the entire image plane and avoid vignetting. In this embodiment, the reference beam is not illustrated but the various solutions described in relation to embodiments 10, 11$a$ and 12$a$ may be implemented in the detection system of FIG. 14$a$.

Referring now to FIG. 15, yet another embodiment of a detection system 8 is illustrated, this embodiment not having a common path configuration. In this embodiment, the sample beam 38 is directed to the image sensor 54 and a separately formed reference beam 40 is also directed to the image sensor 54 via an optical path difference adjustment system (not shown in this embodiment) to adjust the optical path difference between the reference beam and the sample beam. Optical path distance adjustment systems are per se known and need not be further described. In this embodiment, the reference beam may be sourced from the sample beam source that is fed into the optical fibres that are extended along the housing to the illumination system. The reference beam and sample beam may be for instance split at the source by a beam splitter (not shown).

In the embodiment of FIG. 15, the reference and sample beams are independent and are recombined in the end of the process. The reference beam may be generated by a beam-splitting of the source light that is coupled to waveguides of the illumination system that produces the rotating sample beam. The reference and sample optical path lengths are the same for an empty field of view. They can be adjusted by adjusting the length of the reference beam waveguide. The curvature of the reference beam at the image plane of the image sensor 54 may be determined by lenses (e.g. Field lens) at the exit of the reference fibre emitter 68 and an active pivotable (e.g. MEMS) mirror 70. In this way, it is possible to match this curvature with the curvature of the sample beam.

In the embodiment of FIG. 15, the OPD must be adjusted whereby one may estimate the maximum OPD variation as around ~100 μm. The OPD may be varied for instance by a piezo actuator (not shown) coupled to the reference fibre emitter lens 68 and the reference beam can also scan the area of the image sensor 54 (for instance a CMOS light sensor) when the coherence length is smaller than the sensor area, in the case of using short coherence light sources such as super luminescent light emitting diodes (SLED).

Using a low coherent light source (SLED), the interference fringes would be located only in a small part of the image (e.g. CMOS) sensor, therefore only a small part of the field of view can be demodulated at a time. It is possible to generate the multichannel scanning by correcting the optical path length (OPL) of the reference beam. In this way, a better image quality, due to the low coherent light source which improves the Signal to Noise Ratio (SNR) by reducing the added noise in the coherent zone, is obtained and the whole Field Of View (FOV) is covered.

In the embodiment of FIG. 15, the vertical position of the MEMS mirror is defined by the off-axis angle. The MEMS mirror may for instance have a maximum footprint of 2 mm×2 mm×2 mm which is compatible with the space left from the wave collection system 6 lens body 16. The piezo actuator responsible for mainly correcting the OPD may have lateral dimensions smaller than 2 mm×2 mm.

This embodiment is advantageous as it adjusts the OPL of the reference beam in order to generate different zones of coherence on the image sensor. In this example one zone of coherence is generated at a time and the variation of the OPL determines the next zone of coherence that can be demodulated and the phase information from the entire image sensor is retrieved step by step similar to the process illustrated in FIG. 11*c*.

In the embodiment of FIGS. 16*a*-16*f*, the reference beam is itself split in a plurality of reference beams with different OPD compensation with respect to the sample beam. Each reference beam has a specific off-axis configuration so that within the multiplexed hologram the orders are clearly separated in the Fourier Domain to be easily filtered. The phase information retrieved from each order are then combined to be able to have a phase information across the whole sensor.

The optical diffraction tomography microscope according to embodiments of the invention advantageously provides various advantages, including compatibility with the pharma industry standards, e.g. 384 Well-plates but not only.

improved speed of acquisition improved quality of outcome by increasing the resolution and the RI sensitivity capacity of scaling-up to increase throughput to deliver the necessary amount of data for quantification methods to be specific and accurate economical configuration.

The invention in particular provides:

1. Speed of Acquisition:

For achieving a faster acquisition speed, a main limitation in conventional systems is the use of a mechanically rotating beam. In embodiments of the invention, the rotating light beam is formed by a static collection of light sources placed around the sample and switched on in sequence. Those sources could be either a collection of individual sources (Laser diodes, SLED, . . . ) or a collection of waveguides bringing the light towards the sample from a single source previously injected into the waveguides sequentially.

2. Quality of Images: Resolution and Sensitivity a. Resolution

It is known that resolution is directly related to the numerical aperture of both the illumination source and the wave collection device. It is thus advantageous to provide a solution that features high NA for the illumination and of high NA for the light collection, as found in the present invention.

In conventional microscopy, a main drawback of high NA is the high cost of parts due to the complexity of optical arrangements (high number of lenses that require high precision of shape and surface quality and high positioning accuracy). It is thus advantageous to be able to propose a high NA objective which does not require such demanding manufacturing process as found in the present invention which exploits the advantages of the plurality of static illumination sources and the construction of a synthetic spectrum which, contrary to classical imaging techniques, does not requires full aperture, in contrast to the annular aperture of the wave collection system of embodiments of the invention. In effect, the invention provides a wave collection system (i.e. light collector) which exhibits an annular aperture, or said otherwise, a central obscuration. The necessity of having optical surfaces with high quality standards for all the incidence within the NA is thus advantageously avoided.

The light collector, that would not be suitable for classical imaging technology, is well adapted in embodiments of the present invention to collect the frequencies necessary for retrieving the fine 3D structure of RI of the sample under study.

This light collector, or frequency collector, could be refractive or reflective or advantageously both (catadioptric).

Working at high NA imposes strong constraints on sample vessels of the industry, as it would require extremely flat aspect ratio that would make them inappropriate for relevant application of the targeted markets. It is thus advantageous to illuminate the sample from the side, as in the present invention, and not from the top, and in order to minimize the distortion that would be created by the vessels walls it is further advantageous to dip the vessel into liquid (water or other RI matching liquid). It is furthermore advantageous for other sample vessels of the industry, for instance 35 mm petri dishes, to propose a high NA illumination solution that can be dipped into the vessel. The vessel itself is dipped into liquid as well to minimize distortion at optical surfaces interfaces between the vessel and the frequency collector.

b. Sensitivity

To achieve high sensitivity, it is known that one should reduce as much as possible sources of noise (that could add-up in the process of synthetic spectrum construction either coherently or incoherently).

Laser diodes with a coherence length of typically around 300 microns may be implemented in off-axis holography. Working with such low coherence source usually requires usually an OPD (optical path difference) compensation system to match the OPL of the reference beam path and the sample beam path. The common path configuration according to embodiments of the invention advantageously minimizes the optical paths to make them less prone to variations due for instance to thermal variations or mechanical imperfections.

It is furthermore advantageous to benefit from the central obscuration of the frequency collector to insert a beam splitter to create a reference beam.

The common path architecture requires to collect part of the incoming flux of the sample beam that probed the sample in order to create a reference beam by spatial filtering (for instance typically a pinhole of several microns diameter). In an optical diffraction tomography microscope, it is required that the filtering system can deal with the multiple illumination direction and in embodiments of the invention at least two solutions are provided: a pinhole with an active MEMS that may be feedback controlled from a signal coming from the camera, and a tapered fiber in conjunction with a mirror that could be static and thus well adapted for high-speed scanning.

In the invention it is advantageous to use light sources with even lower coherence length (100 um or even 30 um), like SLED. The off-axis architecture imposes a lower limit for the coherence length of the source for sample information to be properly coded in the hologram over the whole sensor, and in order to be able to deal with low coherence source the following multi-plexing solutions may be implemented:

Temporal multiplexing: Integrate a dynamic OPD compensation system in order to swipe the coherence peak over the sensor and get thus a well contrasted hologram.

Spatial multiplexing: Split the sensor into smaller channels and create off-axis architecture for each channel with appropriate OPD matching. The full information of the Field of View is then retrieved by stitching together the information coming from each channel.

Spectral multiplexing: several holograms obtained with different OPD can be recorded simultaneously by varying the individual off-axis geometry or the light source wavelength. Each hologram is individually exploited and combined with the others to retrieve the full information over the total field of view.

3. Throughput and Cost:

The above mentioned advantageous features of embodiments of the invention make it possible to provide a very compact microscope, allowing it for instance to be stacked together for use with the format of standard well plates, for instance a 384 well plate. Its unique design allows for increasing greatly the throughput and hence the screening speed of well plates, a key element to gather in a certain period of time enough data for instance to develop drugs.

4. Flexibility of Configuration and Implementation:

The annular aperture allows the centrally obscured part of the wave collection system to be used for functions other than optical functions. For instance, other sample containing systems such as tubes allowing through flow of fluid containing the samples to be observed may also be advantageously implemented, the tube extending through the center of the lens.

LIST OF REFERENCES USED

Observed sample 1
    e.g. cell
Medium 3a, 3b (in container, outside around container)
Sample container system
    Well plate 5
    Sample container/Well 7
        Side wall 9a
        Bottom wall 9b
    Tube 7'

Optical diffraction tomography microscope 2
    illumination system 4
        sample illumination beam sources
        sample illumination beam 10
        waveguide 12
            waveguide outlet 20
                lens 38
            waveguide channel 22
                optical fibre 40
        waveguide support 24, 24'
        sample observation zone 32
        MEMS multi-inlet optical switch 35
    wave collection system 6 (with central obscuration)
        centrally obscured lens body 16
            (e.g. catadioptric centrally obscured lens body)
            inlet surface 26
            central obscuration 33
            internal reflective surface 28
                first reflector 28a
                second reflector 28b
        embodiment with integrated beam splitter
        sample beam internal reflective surface 28
            first reflector 28a
            second reflector 28b
        reference beam internal reflective surface 29
            first reflector 29a
            second reflector 29b
        internal inactive surface(s) 30
            (e.g. absorbing surface)
                first inactive surface 30a
                second inactive surface 30b
        outlet surface 34
    detection system 8
        common path detection device 36
            beam separation system
                sample beam path 38
                reference beam path 40
                Beam splitter 46
                reference beam mirror(s) 48, 48a, 48b
                reference beam filter 50
                pinhole
                optical fibre 50a
                tapered entry 51
                sample beam mirror 58
                Beam combiner 56
                waveguide distributor 60
                reference beam waveguides 64
                sample beam projection area 65, 65a, 65b
            dual sensor beam splitter 66
            OPD compensation system 52
            lenses 53
                image sensor(s) 54, 54a, 54b
                image sensor channels 65
                microlenses 62
        detection device (not common path)
            reference beam emitter 68 (fibre and lens)
            Pivotable mirror 70
    computation device 18
        image reconstruction processing module
Hologram 11
    Hologram ring 13
sample illumination beam inclination β
lens numerical aperture angle α
sample beam capture angle δ
centre axis A
central obscuration or central inactive area diameter d1
lens aperture diameter d2

The invention claimed is:

1. An optical diffraction tomography microscope comprising an illumination system configured for transmitting a sample beam through a sample observation zone, a wave collection system and a detection system, characterized in that the wave collection system comprising a lens with an annular aperture, the wave collection system configured to collect sample illumination beams emitted by the sample illumination beam sources at a beam inclination angle (β) with respect to a center axis (A) extending through the sample observation zone, of between 10° and 85°.

2. The microscope according to claim 1, wherein said beam inclination angle (β) is between 40° and 75°.

3. The microscope according to claim 1, wherein said beam inclination angle (β) is between 50° and 70°.

4. The microscope according to claim 1, wherein a ratio d1/d2 of a diameter d1 of a central obscuration or central inactive area relative to a diameter of an aperture d2 of the lens is in a range of 5% to 95%.

5. The microscope according to claim 4, wherein said ratio d1/d2 is in a range of
30% to 90%.

6. The microscope according to claim 4, wherein said ratio d1/d2 is in a range of 50% to 80%.

7. The microscope according to claim 1, wherein the lens comprises internal reflective surfaces including a first reflector and a second reflector.

8. The microscope according to claim 1, wherein the lens comprises at least one central internal inactive surface forming a central obscuration.

9. The microscope according to claim 1, wherein the lens comprises a central inlet surface and internal reflective surfaces comprising a first reflector and a second reflector, the first reflector receiving the sample illumination beam incident from the inlet surface of the passage through the sample observation zone, and the second reflector receiving the sample illumination beam from the first reflector and further directing the sample illumination beam through an outlet surface of the lens body towards the detection system.

10. The microscope according to claim 1, wherein the lens is fixedly mounted to the illumination system and an inlet surface of the lens forms a bottom surface of the sample observation zone.

11. The microscope according to claim 10, wherein the lens is fixedly mounted to a wave guide support of the illumination system.

12. The microscope according to claim 1, wherein the wave collection system is sealingly coupled to the illumination system such that a liquid medium may be filled within the sample observation zone over the lens inlet surface.

13. The microscope according to claim 1, wherein a diameter of the sample observation zone bounded by the illumination system is in a region of 1 mm to 10 mm, a height of the sample observation zone as defined between a distance from the light source to an inlet surface of the lens body is in a range from 0.5 mm to 5 mm and an outer diameter of an outlet surface of the lens body is in a range from 5 mm to 100 mm.

14. The microscope according to claim 13, wherein said height of the sample observation zone is in a range of from 0.7 mm to 1.5 mm.

15. The microscope according to claim 13, wherein said outer diameter of the outlet surface of the lens body is in a range from 10 mm to 20 mm.

16. The microscope according to claim 1 comprising a plurality of illumination and wave collection systems arranged for simultaneous observation of a plurality of containers of a multi container system.

17. The microscope according to claim 1 wherein the lens further incorporates a beam splitter for splitting a reference forming beam from the sample beam.

18. The microscope according to claim 17, wherein the lens comprises a semi reflective surface forming the beam splitter positioned between an upper portion and a lower portion of a body of the centrally obscured lens.

19. The microscope according to claim 17 wherein the lens further comprises reference beam internal reflective surfaces comprising a first reflector and a second reflector configured to exit the reference forming beam out of a central portion of the lens arranged coaxially within a sample beam outlet surface of the lens.

20. The microscope according to claim 1 wherein the detection system comprises a common-path configuration.

21. The microscope according to claim 1 wherein the illumination system comprises a plurality of static sample illumination beam sources arranged around a sample observation zone of the illumination system within which a sample container is positionable, the static sample illumination beam sources configured to emit sample illumination beams at a beam inclination angle (β) with respect to a center axis (A) extending through the sample observation zone, the static sample illumination beam sources connected to a light generator configured to sequentially switch from one beam source to the next to generate a moving sample illumination beam around the sample observation zone.

* * * * *